(12) United States Patent
Zielke et al.

(10) Patent No.: US 7,039,183 B2
(45) Date of Patent: May 2, 2006

(54) TERMINATION BLOCK

(75) Inventors: Darrell W. Zielke, Bothell, WA (US); Aubrey D. Nelson, Seattle, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 26 days.

(21) Appl. No.: 10/800,512

(22) Filed: Mar. 15, 2004

(65) Prior Publication Data

US 2005/0213750 A1    Sep. 29, 2005

(51) Int. Cl.
*H04M 9/00* (2006.01)
*H01R 9/24* (2006.01)

(52) U.S. Cl. .................. 379/413.04; 439/709

(58) Field of Classification Search .......... 439/562, 439/676, 535, 536, 404, 347, 450–473, 889, 439/709; 379/435, 413, 413.02, 413.04
See application file for complete search history.

(56) References Cited

U.S. PATENT DOCUMENTS

| | | | |
|---|---|---|---|
| 3,675,183 A | * | 7/1972 | Drake .................. 439/457 |
| 4,040,699 A | * | 8/1977 | Rasmussen ............. 439/344 |
| 4,146,292 A | * | 3/1979 | Garrett .................. 439/347 |
| 4,865,564 A | * | 9/1989 | Denkmann et al. ...... 439/404 |

* cited by examiner

Primary Examiner—Sinh Tran
Assistant Examiner—Walter F Briney, III
(74) Attorney, Agent, or Firm—George C. Rondeau, Jr.; Davis Wright Tremaine LLP

(57) ABSTRACT

A termination block having spaced apart rear and front faces with rear and front apertures, respectively, and a plurality of mounting surfaces on the rear face. A screw receiving portion receiving a screw is positioned at each mounting surface. An interior recess is between the rear and front faces, accessible from the rear and front faces through the rear and front apertures. A terminal connection pad is positioned at the rear face at each mounting surface, and a plurality of tines extend through the rear aperture and are positioned within the interior recess for access through the front aperture. Each tine has a flat contact end portion. A plurality of trace members positioned at the rear face, each electrically coupling together one of the terminal connection pads and one of the tines. The terminal connection pads, tines and trace members are formed as part of a stamped, thin, flat lead frame.

54 Claims, 24 Drawing Sheets

TERMINATION BLOCK

BACKGROUND OF THE INVENTION

1. Field of the Invention

The present invention is directed generally to communication interface equipment and, more particularly, to termination blocks for connecting systems for telephone networks.

2. Description of the Related Art

Termination blocks are used to quickly connect telephonic devices, such as telephones, to telephone networks. A termination block provides a multi-wire connector jack, having multiple tines, to receive a multi-wire connector plug having multiple tines such that contact is made between the corresponding pairs of plug and jack tines when the connector plug is inserted into the connector jack. The jack tines are connected by wires to termination screws to which the wires of a telephone network are also connected.

The multi-wire connector plug is typically connected to a phone cord having two, four, or more wires by making connections between the corresponding pair or pairs of phone cord wires and plug tines. The phone cord wires are connected to a telephonic device such as a phone.

The termination block is typically mounted to a faceplate and positioned inside of a wall of a room. The faceplate has an opening to access the multi-wire connector jack from the room to allow the multi-wire connector plug of the telephonic device placed in the room to be inserted into the connector jack. Termination blocks allow telephonic devices to be quickly connected to and disconnected from the telephone network. Unfortunately, construction of conventional termination blocks is more expensive and less reliable than desired. Conventional termination blocks have numerous parts including multiple washers, wires, wire connectors, and other parts that are typically hand assembled. Also, since so many parts are involved, very extensive testing is required for each assembled termination block, which further adds to the inconvenience of construction resulting in undesirable costs being incurred.

BRIEF SUMMARY OF THE INVENTION

The present invention resides in a termination block. One disclosed embodiment include a rear face with a rear aperture; a front face with a front aperture, the front and rear faces being spaced apart; and a plurality of mounting surfaces on the rear face. A plurality of screw receiving portions are each positioned at one of the mounting surfaces and have an opening and a screw receiver extending from the rear face toward the front face. An interior recess is provided between the rear and front faces. The interior recess is accessible from the rear face through the rear aperture and accessible from the front face through the front aperture.

A plurality of screws are each extending through the opening of one of the screw receiving portions and threadably received in the screw receiver thereof.

A plurality of terminal connection pads are positioned at the rear face at one of the mounting surfaces. Each of the terminal connection pads has a screw aperture therethrough positioned in alignment with the opening of the screw receiving portion positioned at the mounting surface and one of the screws extends through the screw aperture. A plurality of tines extends through the rear aperture of the rear face and are positioned within the interior recess and positioned for access through the front aperture. Each tine has a contact end portion. The contact end portions of the tines are in spaced apart arrangement in position within the interior recess. A plurality of trace members are positioned at the rear face, with each trace member electrically coupling together one of the terminal connection pads and one of the tines.

The illustrated embodiment includes a plug extending through the rear aperture of the rear face and within the interior recess and holding the tines in spaced apart arrangement. The plug has a plurality of channels, each having one of the tines positioned therein. The plug has a cover portion extending over a portion of the rear face and covering at least a portion of the trace members.

The illustrated embodiment also has at least one rear raised portion positioned adjacent to each of the terminal connection pads and extending from the rear face rearward beyond the adjacent terminal connection pad.

The termination block may also include a plurality of forwardly projecting front support members. The front support members are positioned to engage at least a portion of the rear raised portions of another termination block when two termination blocks are positioned in engagement with the front face toward the rear face of the another termination block. The combined length of the front support members and the portions of the rear raised portions in engagement are sufficient to keep the front face from contacting the rear face of the another termination block, whereby damage to the screws is prevented during face to face shipment or storage of the termination blocks.

The illustrated embodiment includes rear raised portions positioned adjacent to the trace members and extending from the rear face rearward beyond the trace members with the trace members positioned therebetween.

A plurality of spaced apart channels are also provided in the illustrated embodiment at the rear face. Each channel receives a free end portion of one of the tines.

Each of the tines springably engage a portion of the rear face to generate a forwardly directed tension force on the tine. In the illustrated embodiment the free end portion of one of the tines is positioned in each of the channels.

The plug extending through the rear aperture of the rear face and within the interior recess in the illustrated embodiment applies a forward force to the tines to generate a forwardly directed tension force in the tine.

The contact end portion of each of the tines has a flat forward facing contact surface with a coating of conductive metal thereon and the other portions of the contact end portion are uncoated.

A screw retainer extends rearward from the rear face and is sized to removably retain a mounting screw used to mount a mounting member to which the termination block is attached. The screw retainer is sized to retain a wire cable having wires to be connected to the terminal connection pads when the mounting screw is removed therefrom to serve as a cable strain relief.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

Figure 9:
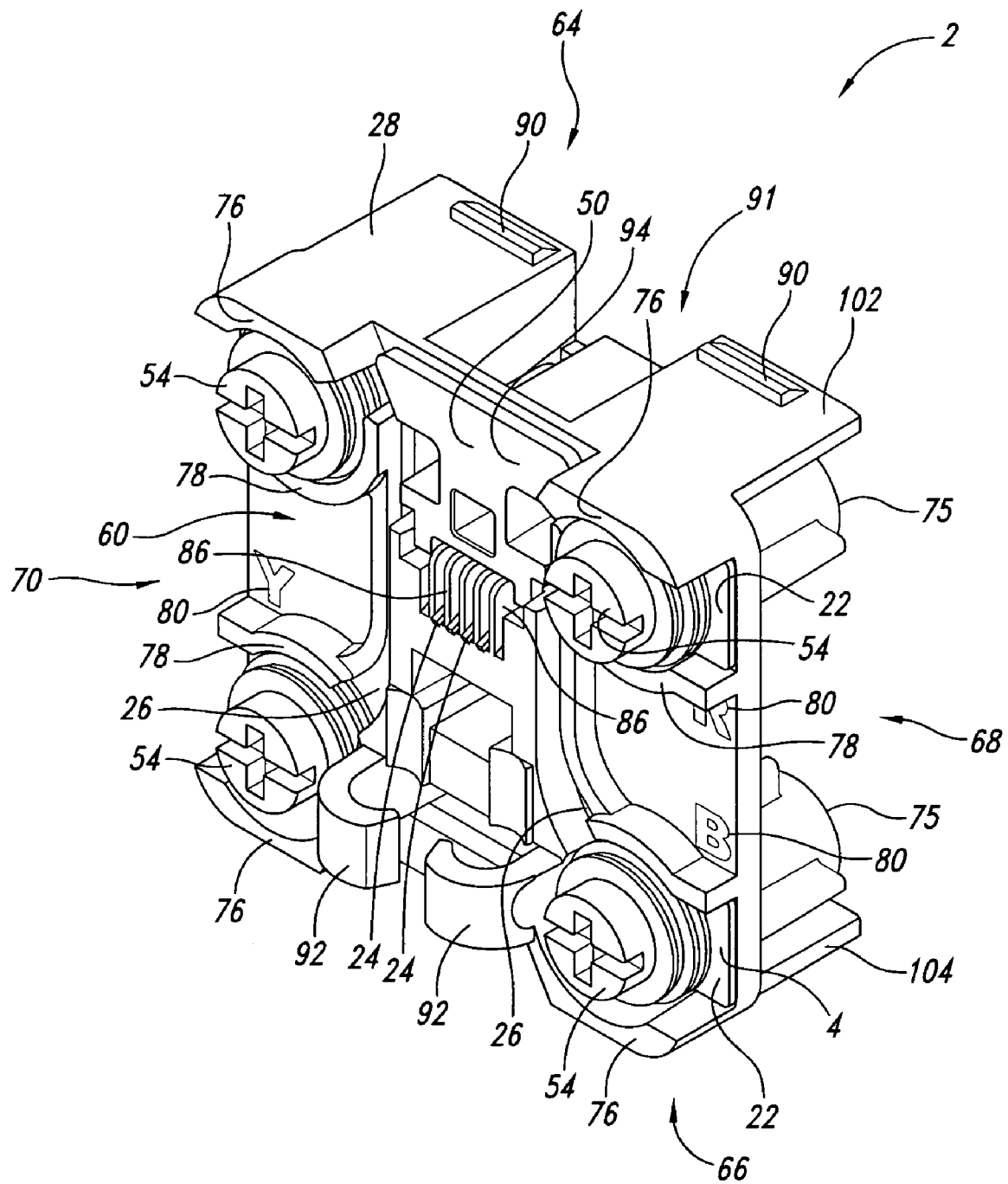
FIG. 9 is an isometric rear view of the fully assembled termination block.

As will be discussed in greater detail herein, a termination block 2, shown fully assembled in FIG. 9, is disclosed that greatly reduces the number of individual parts required with conventional termination blocks, thus reducing the manufacturing cost of the termination block and increasing reliability. Other advantages of the termination block 2 will be described.

Figure 1:
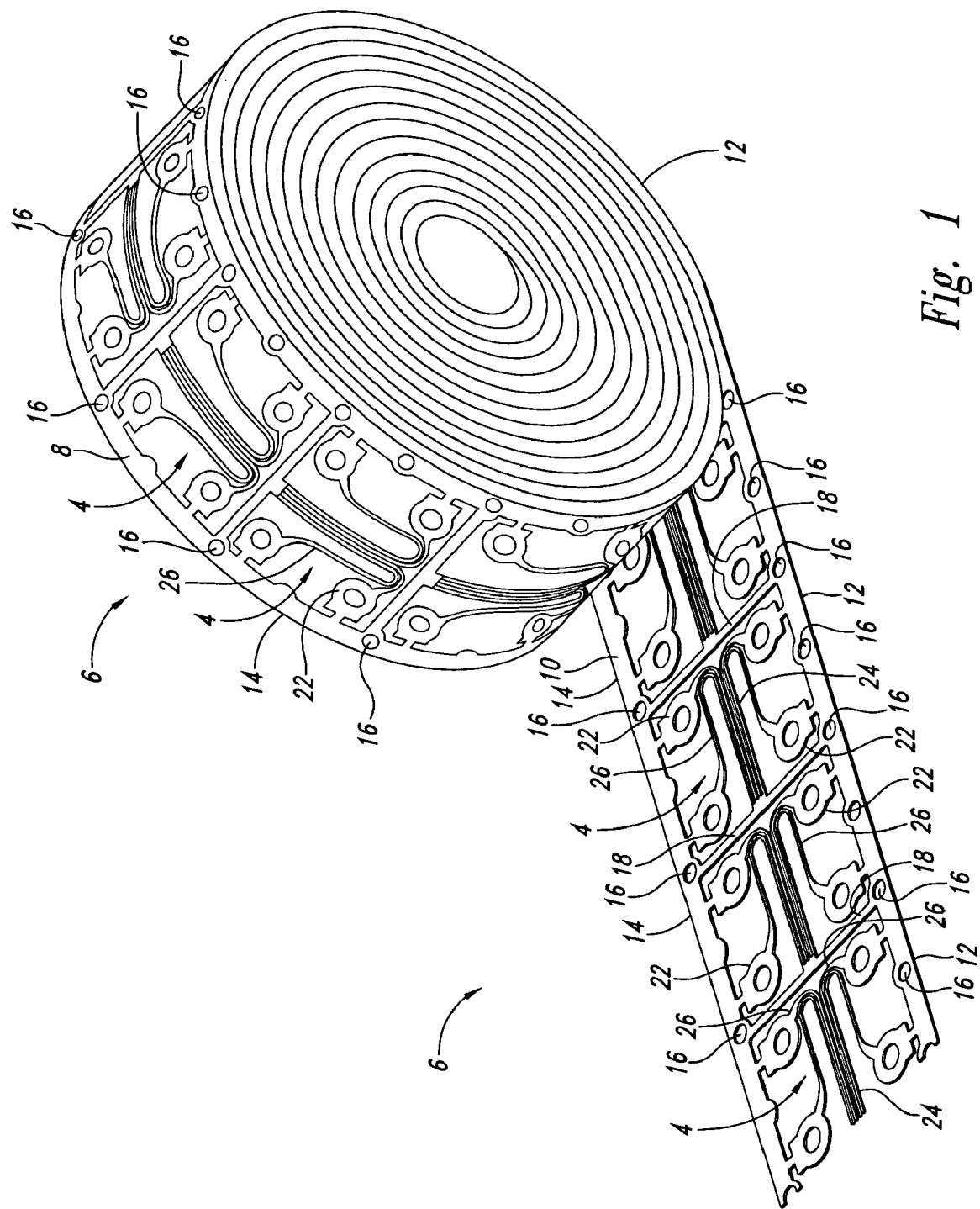
FIG. 1 is an isometric schematic of a roll of lead frames.

The termination block 2 is manufactured using a stamped, thin, flat lead frame 4 detached from a roll 6 of continuous strip lead frames, shown in FIG. 1 partially unrolled. Several of the unrolled lead frames 4 are shown with a flat front face surface 8 (facing downward in FIG. 1) and a flat rear face surface 10 (facing upward in FIG. 1). The individual lead frames 4 are positioned between and attached to left and right side edge strips 12 and 14, respectively, of the roll 6. Each of the left and right side edge strips 12 and 14 include a series of sprocket holes 16.

As is conventional, the sprocket holes 16 are used in stamping for precise orientation and in other aspects of manufacturing the termination block 2 using the lead frame 4. The sprocket holes 16 on the left and right side edge strips 12 and 14 are laterally aligned, except that there is no sprocket hole on the right side edge strip 14 corresponding to every other one of the sprocket holes of the left side edge strip 12 to prevent the inadvertent inversion of the otherwise symmetrical lead frames 4 of the roll 6. As will be described below, in the illustrated embodiment only the flat front face surface 8 of a portion of each lead frame 4 is coated with a highly conductive metal such as gold so keeping the lead frame properly oriented is desirable.

The roll 6 includes a cross members 18 associated with each lead frame 4, and extending between and attached to the left and right edge strips 12 and 14. Each of the lead frames 4 is attached to one of the cross members 18, as will be describe below.

The lead frames 4 each include four terminal connection pads 22 with apertures therethrough, four parallel tines 24 and four trace members 26. The trace members 26 each electrically couples one of the terminal connection pads 22 to a corresponding one of the tines 24. Before the lead frame 4 is detached from the roll 6, the terminal connection pads 22 located toward the left side edge strip 12 are attached thereto, and the two of the terminal connection pads located toward the right side edge strip 14 are attached thereto. Similarly, before the lead frame 4 is detached from the roll 6, an end of each of the tines 24 is attached to the cross member 18 associated with the lead frame. The cross member 18 holds what will become the free ends of the tines 24 properly spaced apart until the tines are detached therefrom.

Figure 4:
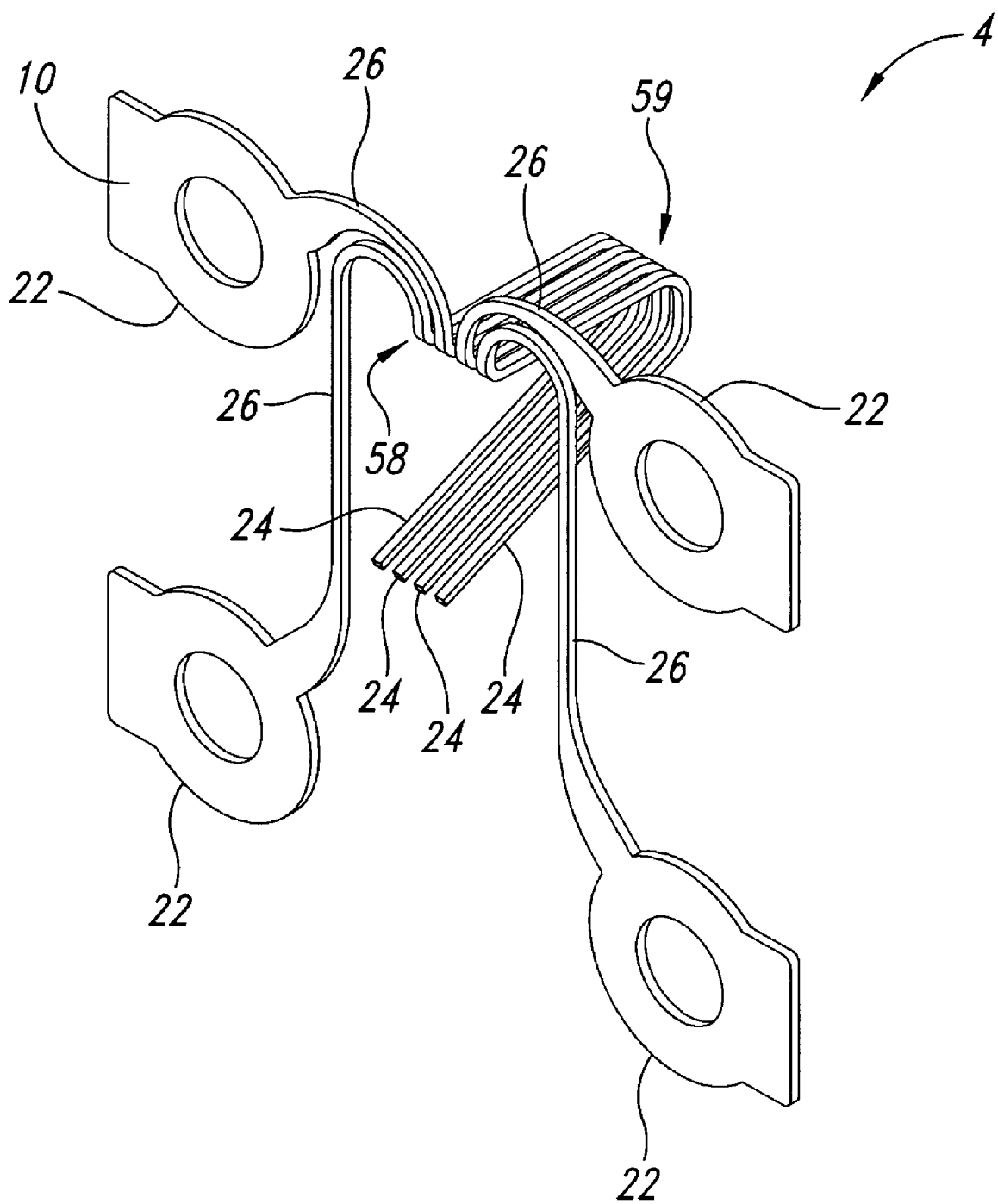
FIG. 4 is an isometric rear view of one lead frame showing the tines after being bent for mounting to a termination block base.
Figure 5:
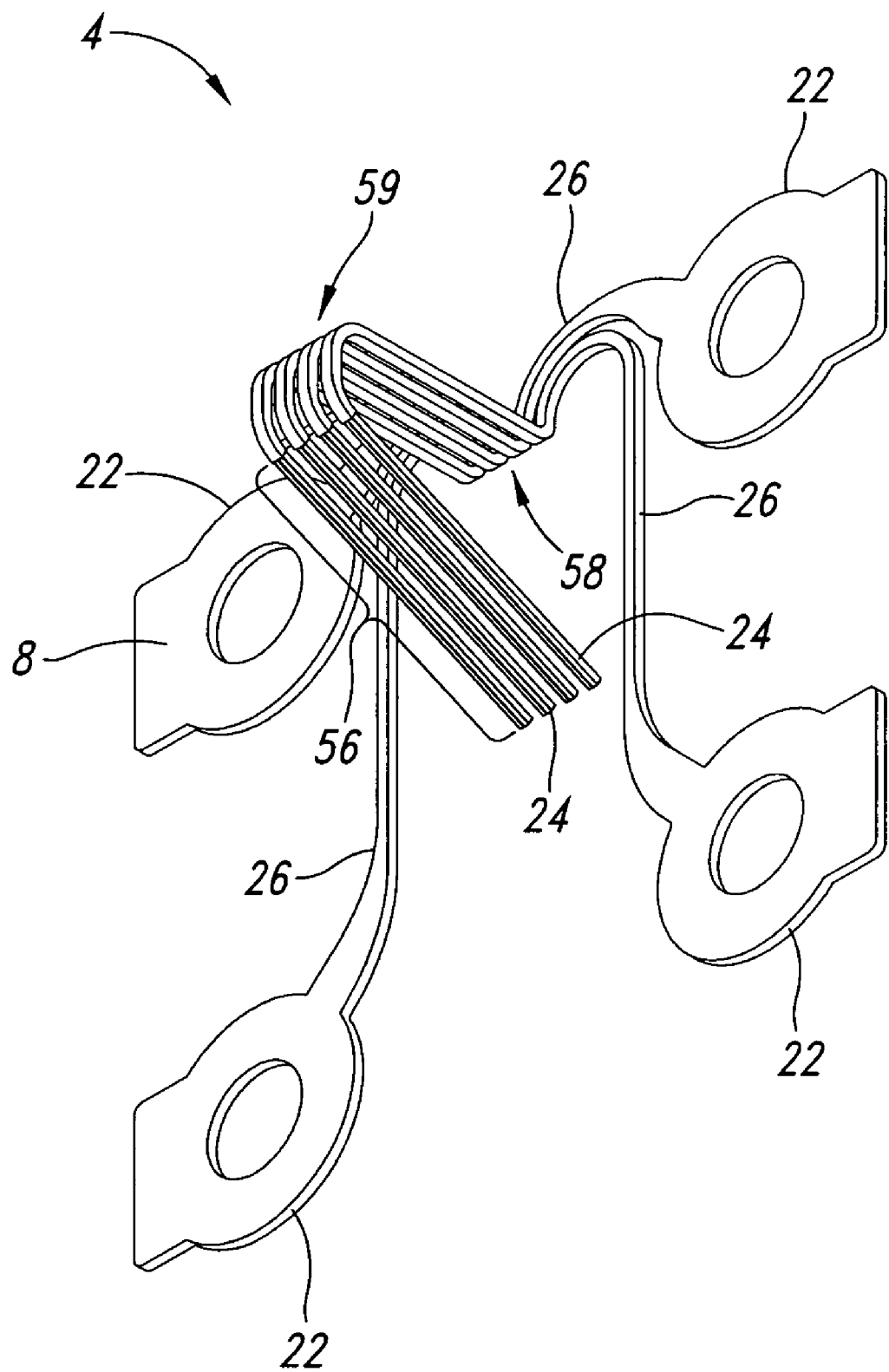
FIG. 5 is an isometric front view of the lead frame of FIG. 4.
Figure 6:
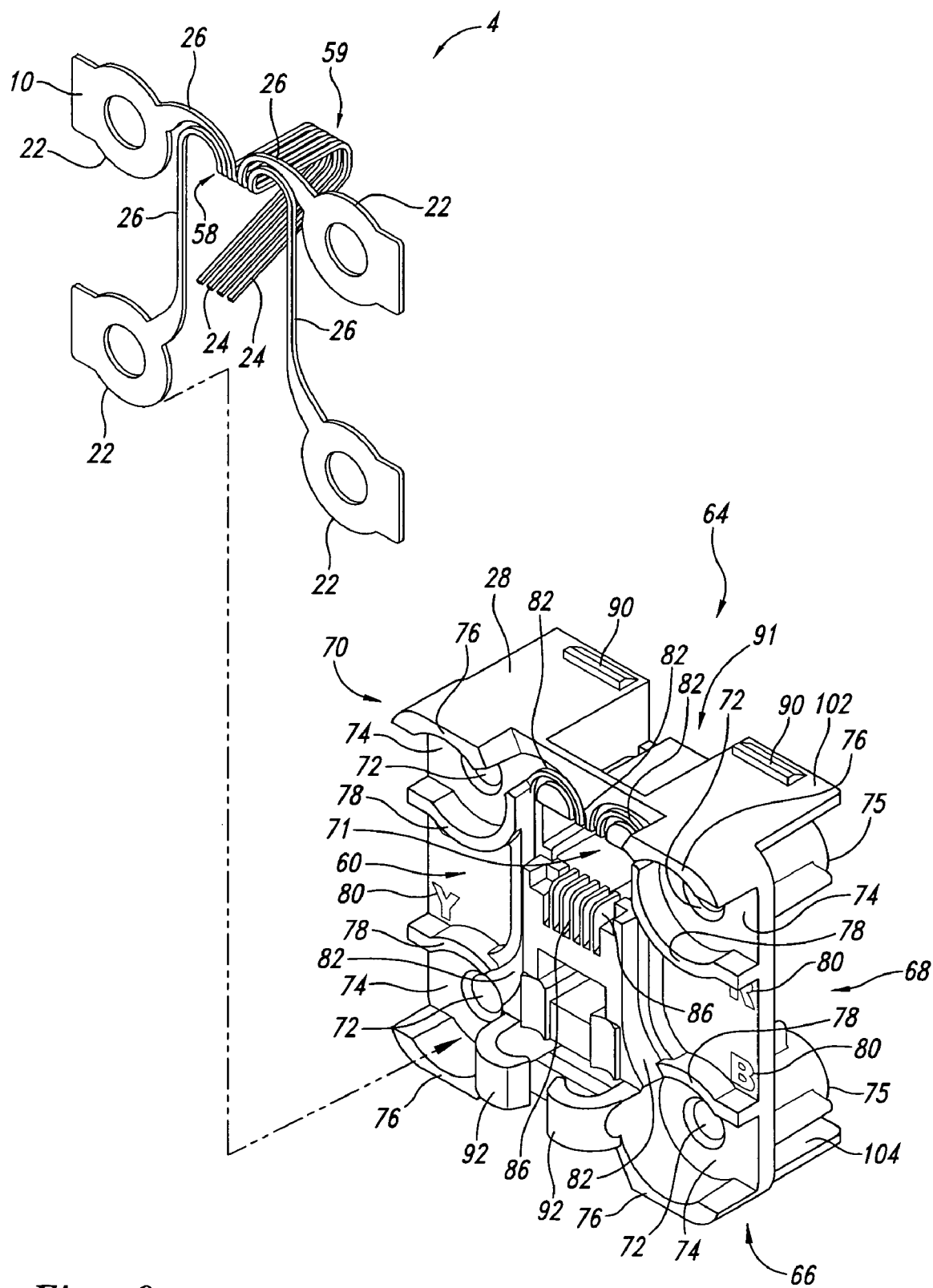
FIG. 6 is an isometric rear view of the lead frame of FIG. 4 oriented for mounting to a termination block base.

The lead frame 4 is shown in FIGS. 4 and 5 detached from the roll 6 with the tines 24 thereof bent in preparation for mounting of the lead frame to a termination block base 28 shown in FIG. 6. When detached from the roll 6, and ready for use, each lead frame 4 comprises four separate circuit portions, each circuit portion having one terminal connection pad 22 with one aperture therethrough, one tine 24 and one trace member 26 electrically couples the terminal connection pad and tine together. Each circuit portion is a unitary conductor with the terminal connection pad 22, the tine 24 and the trace member 26 thereof being of one-piece construction.

Figure 2:
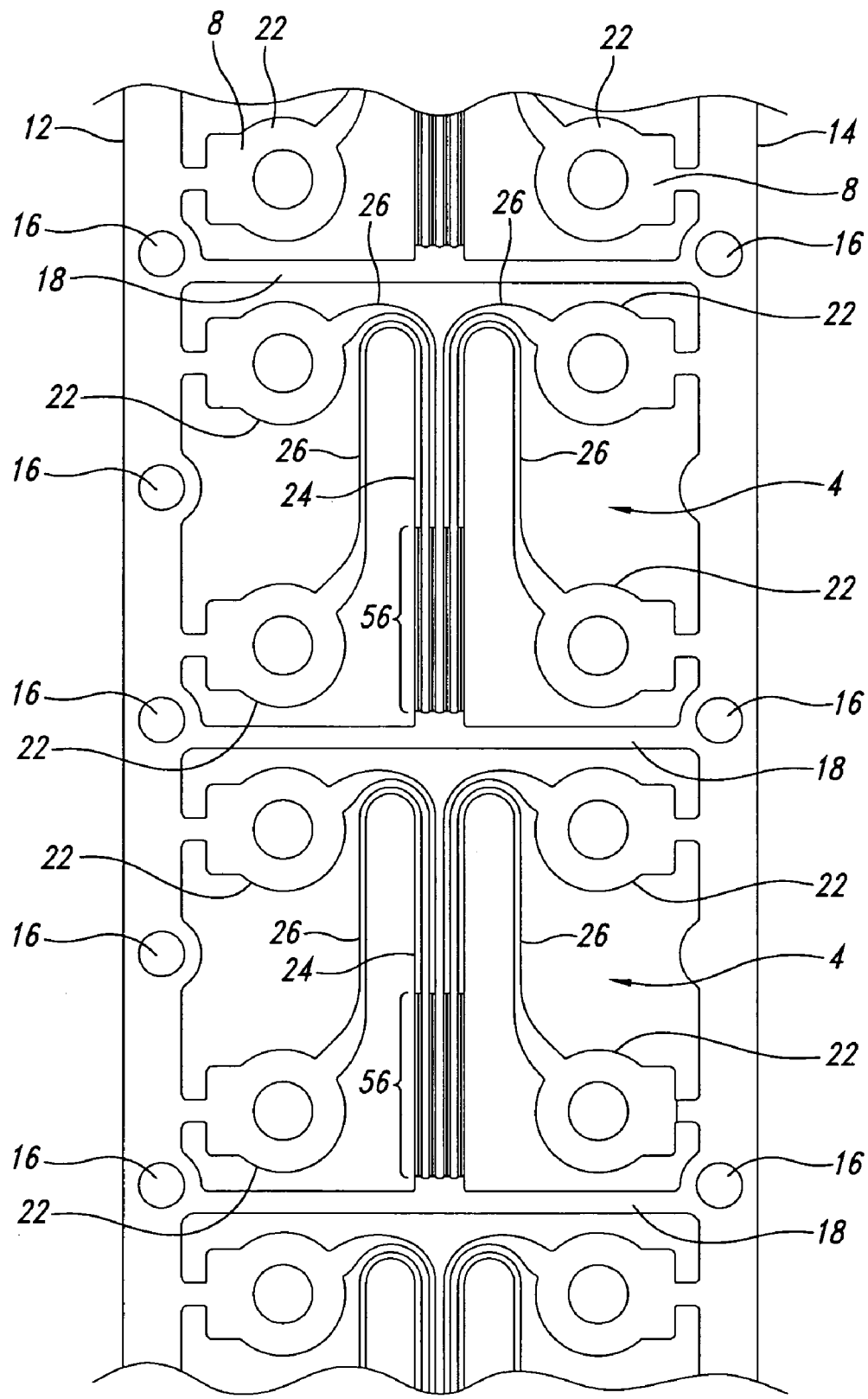
FIG. 2 is a top plan view of a several lead frames of the lead frame roll of FIG. 1 showing the front faces of the lead frames.
Figure 3:
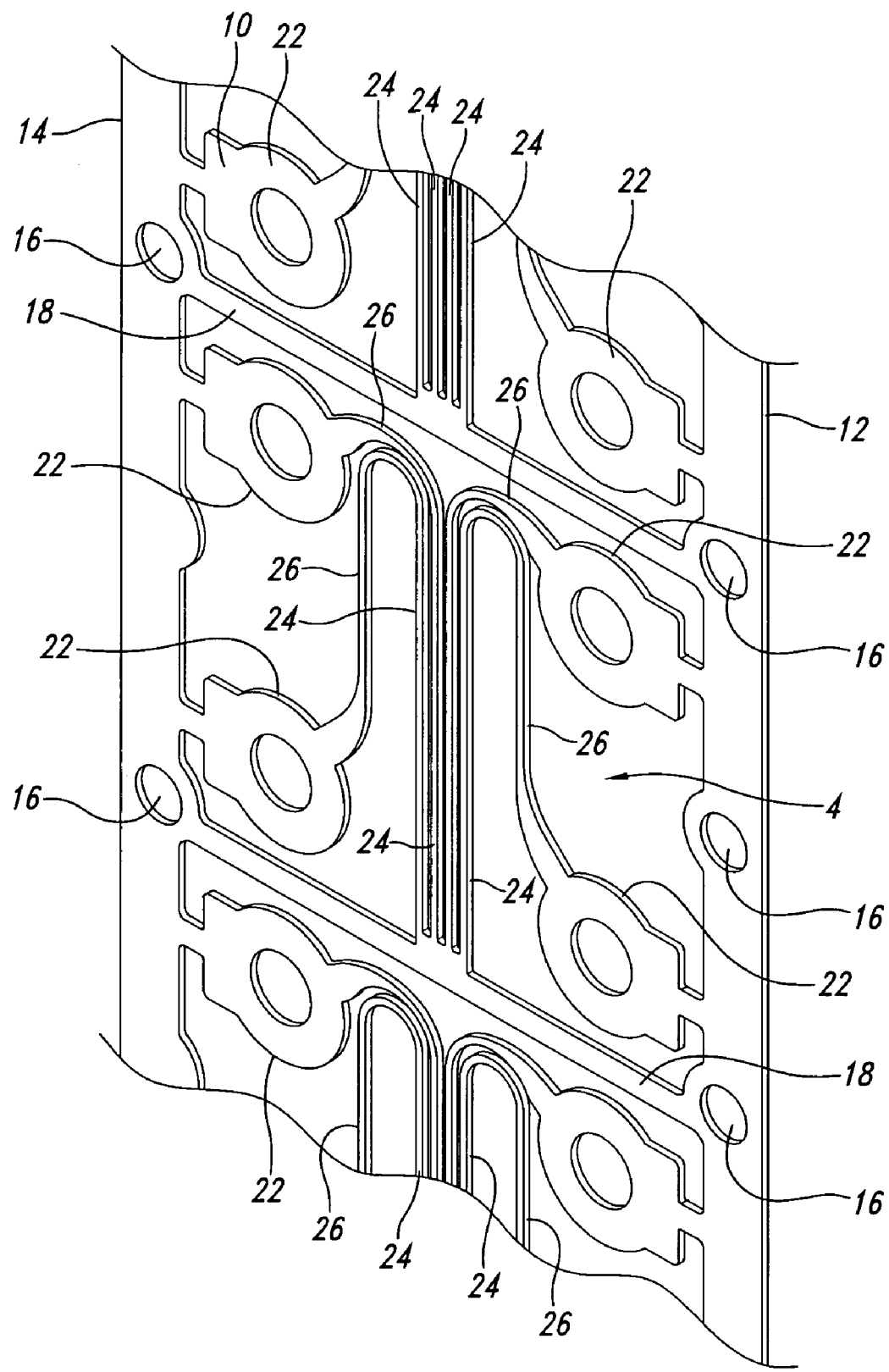
FIG. 3 is an isometric view of a frame of several of the lead frames of the lead frame roll of FIG. 1 showing the rear faces of the lead frames.

As best illustrated in FIG. 2, the flat front face surface 8 of the tines 24 of the lead frame 4 have an end portion 56 coated with a highly conductive metal such as gold. The coated end portions 56 of the tines 24 of the lead frame 4 will be positioned when mounted to the termination block base 28 in generally parallel and planar alignment with each other for contact with the tines of a connector plug (not shown) when inserted into the termination block 2. As illustrated in FIG. 3, the rear face surface 10 of the tines does not require such a coating since it will not be positioned to contact with the tines of the connector plug, thus saving on material and processing costs.

As illustrated in FIGS. 4 and 5, the tines 24 are bent to form a first bend 58 at about the location of their connection to the trace members 26, and a second bend 59 spaced away from the coated end portions 56 of the tines. The orientation of the tines 24 of the lead frame 4 with respect to the termination block base 28 is shown in FIG. 6 prior to mounting of the lead frame to the termination block base.

Figure 10:
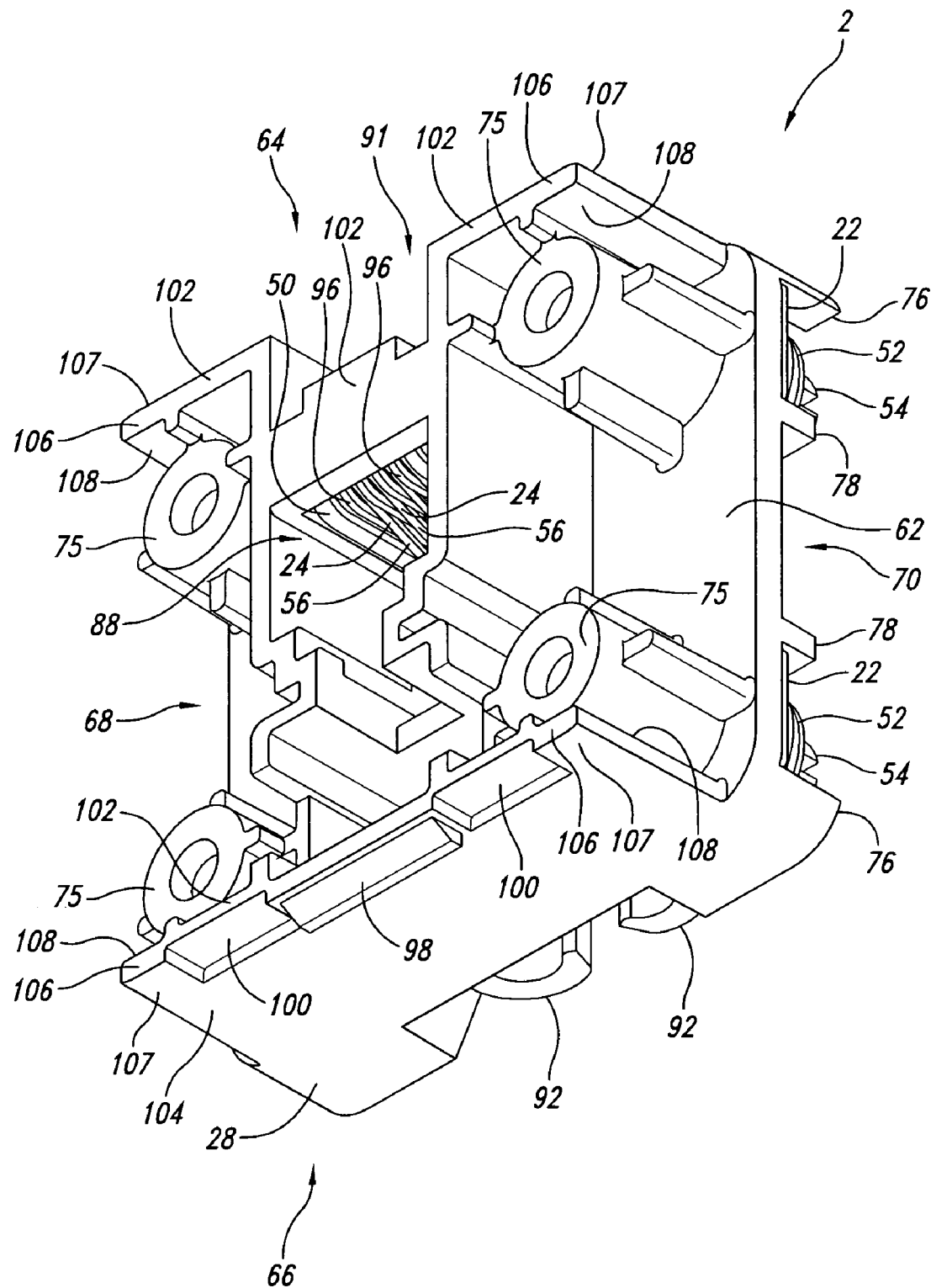
FIG. 10 is an isometric front view of the termination block of FIG. 9.
Figure 11:
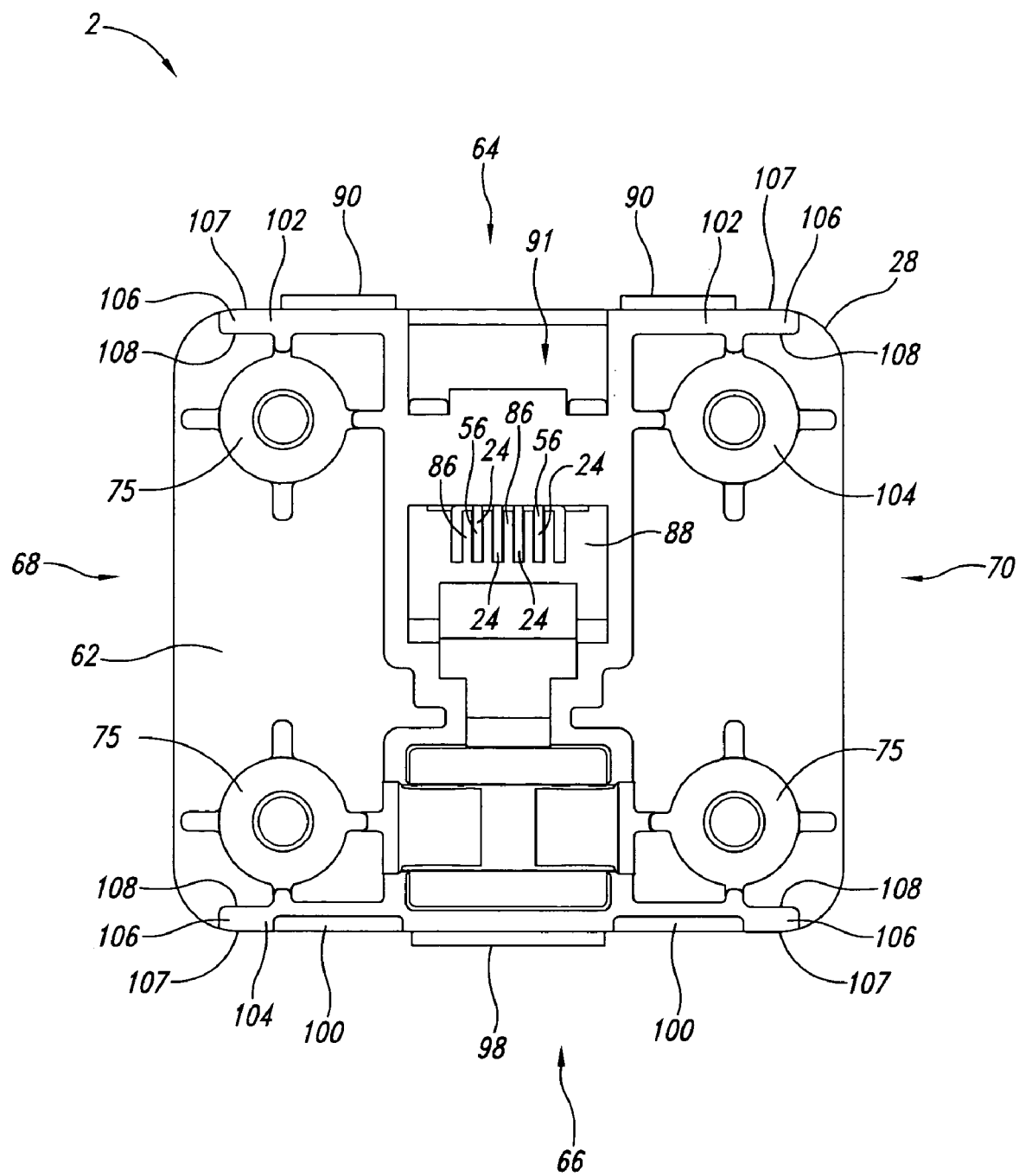
FIG. 11 is a front view of the termination block of FIG. 10.

As illustrated in FIGS. 6, 10 and 11, the termination block base 28 has a rear face surface 60, a front face surface 62, and four side surfaces 64, 66, 68 and 70. The rear face surface 60 of the termination block base 28 has coplanar mounting surface portions shaped similar to the terminal connection pads 22 and trace members 26 of the lead frame 4. The mounting surface portions of the rear face surface 60 of the termination block base 28 corresponding to the terminal connection pads 22 are identified in FIG. 6 by reference numeral 74.

Figure 7:
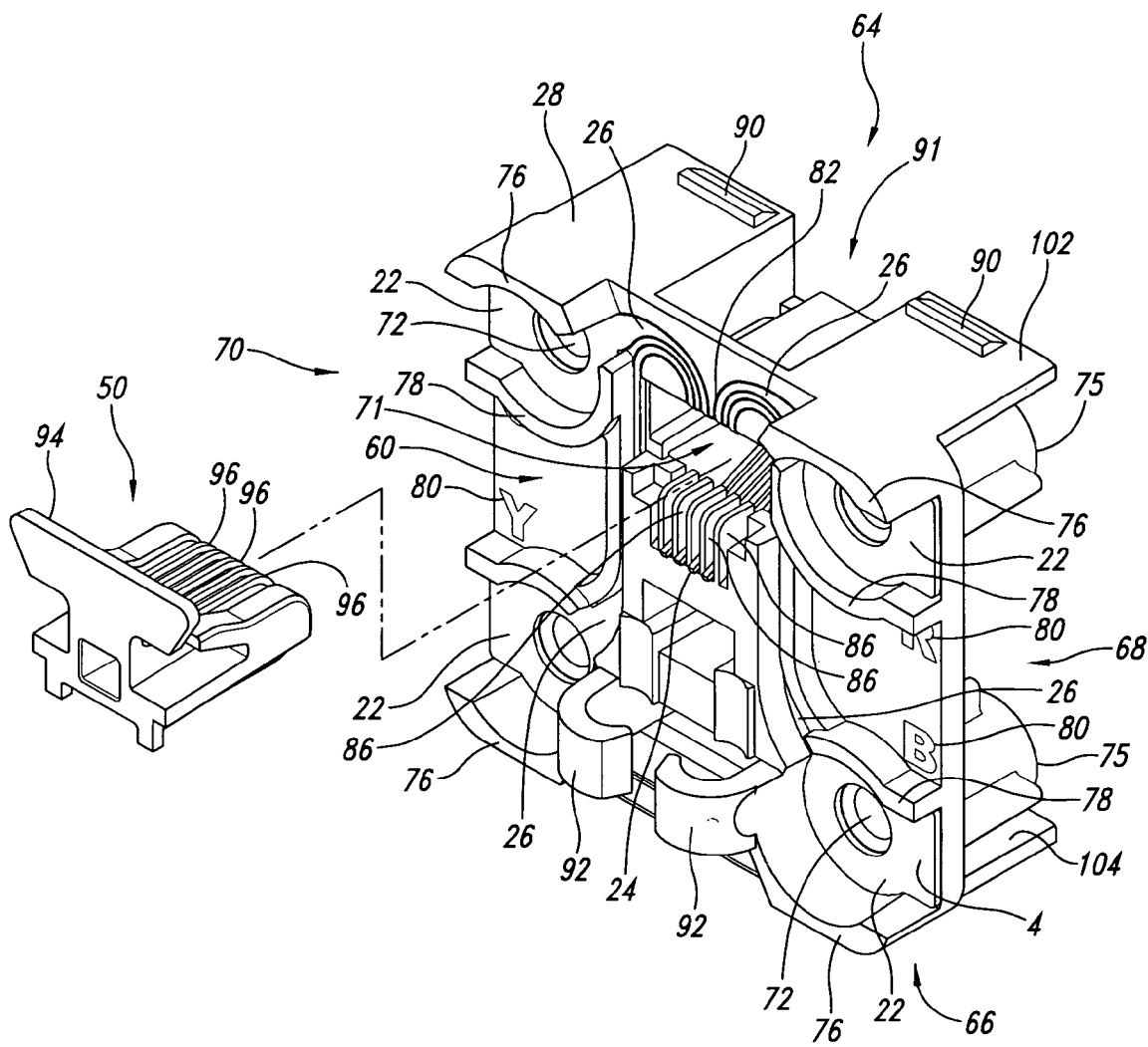
FIG. 7 is an isometric rear view of the lead frame of FIG. 6 mounted in the termination block base with a block plug oriented for insertion into the termination block base at the location of the bent tines.

In FIG. 7 the lead frame 4 is shown mounted to the termination block base 28, with the front face surface 8 of the coplanar terminal connection pads 22 and trace members 26 of the lead frame engaging the correspondingly shaped coplanar mounting surface portions of the rear face surface 60 of the termination block base. The termination block base 28 has an aperture 71 opening in the rear face surface 60 positioned to receive therein the bent tines 24 of the lead frame 4 when mounted to the termination block base.

Figure 8:
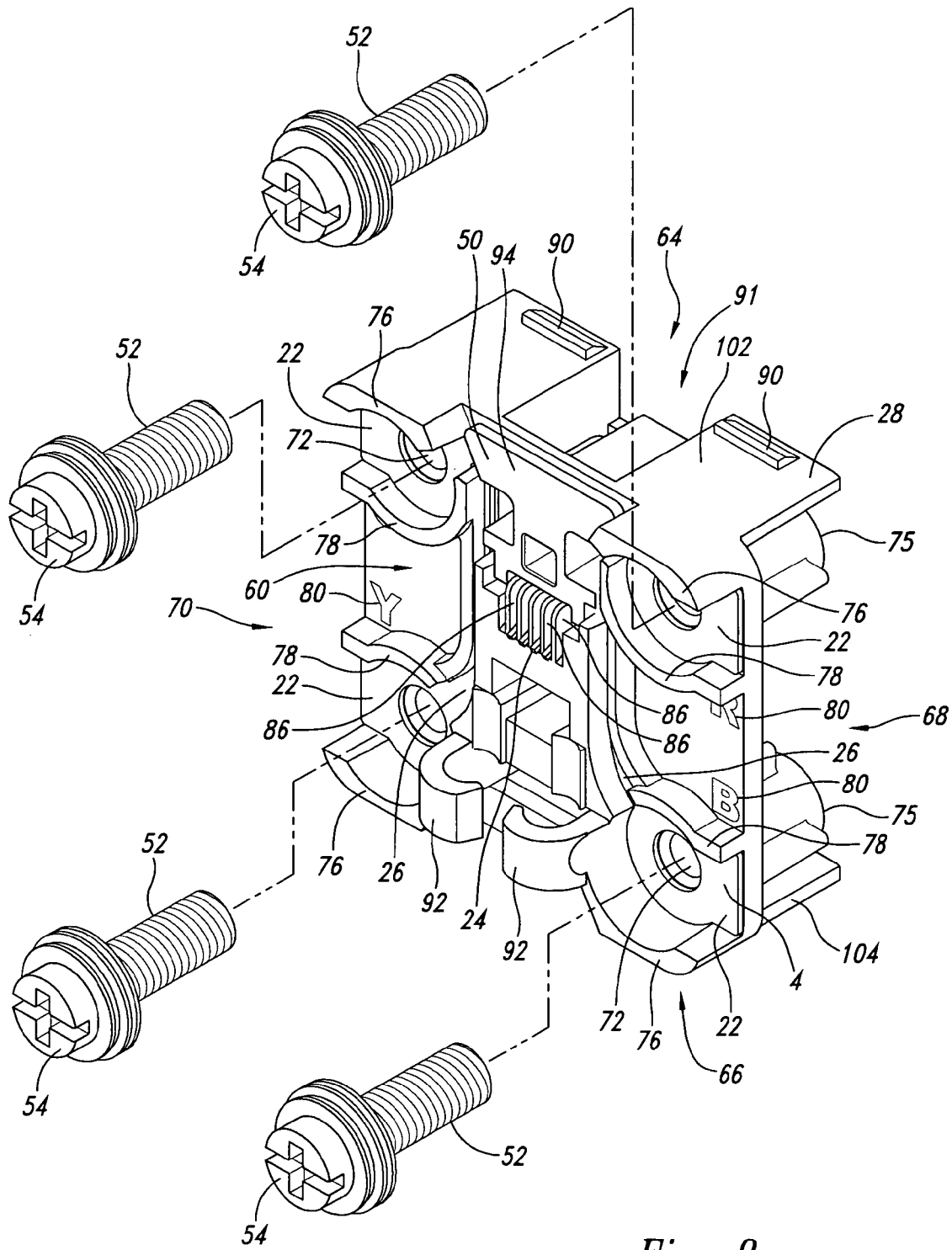
FIG. 8 is an isometric rear view of the assembled lead frame, termination block base and block plug of FIG. 7 with four screw oriented for being threadably received by the termination block base.

A termination block plug 50 is shown in FIG. 7 in position for insertion into the aperture 71 of termination block base 28 after the bent tines 24 of the lead frame 4 are first inserted into the aperture. The plug 50 is shown fully inserted into the aperture 71 in FIG. 8. The plug 50 has a cover flange 94 arranged such that when the plug is inserted into the aperture 71, the cover flange projects outward and covers portions of the trace members 26 extending away from the tines 24 toward the terminal connection pads 22. The plug 50 also has four spaced apart tine channels 96 that each receives therein a portion of a different one of the tines 24 when the plug is inserted into the aperture 71. When inserted, the plug 50 engages the tines 24 and presses them forward, which causes the free end portions thereof to engage a portion of the rear face surface 60 of the termination block base 28 adjacent to the aperture 71 and place the tine under a forwardly directed tension force.

The termination block base 28 has four screw holes 72 located at the mounting surface portions of the rear face surface 60 thereof with shapes similar to the terminal connection pads 22 of the lead frame 4. The screw holes 72 coincide with the apertures of the terminal connection pads 22 and are sized to threadably receive screws 52 with screw heads 54 (shown in FIG. 8 in position for insertion into the screw holes and in FIG. 9 fully inserted). The screws 52 are used to secure wires from a telephone network (not shown) to the terminal connection pads 22 of the lead frame 4 in electrical connection therewith. The screw holes 72 extend through four tubular body portions 75 of the termination block base 28.

The rear face surface 60 of the termination block base 28 further includes four raised supports 76, one to an outward side of each mounting surface portion 74 corresponding to one of the terminal connection pads 22, and a raised pad wall 78 to an inward side of each mounting surface portion corresponding to one of the terminal connection pads spaced apart to receive the terminal connection pad therebetween. The raised support 76 and the raised pad wall 78 protect the terminal connection pad 22 from contact by wires other than the one to be connected thereto.

The termination block base 28 also has indicia 80 at the rear face surface 60 adjacent to the terminal connection pads 22 to identify various colors of wire to be connected thereto according to telecommunication convention (e.g., red, yellow, green, and black). The screw heads 54 are also painted with different colors according to the telecommunication convention (e.g., red, yellow, green, and black) to facilitate proper identification of the wires to be connected to the terminal connection pads 22 by an installer of the termination block 2.

The rear face surface 60 of the termination block base 28 also has raised wall portions 82 which extend along adjacent to the mounting surface portions of the rear face surface that correspond to the trace members 26 of the lead frame 4 to protect the trace members. When the plug 50 is inserted into the aperture 71, the cover flange 94 of the plug extends over and above the portions of the raised wall portions 82 adjacent to the trace members 26 extending away from the tines 24 toward the terminal connection pads 22.

The rear face surface 60 of the termination block base 28 also includes five parallel raised wall portions 86 defining four receiving areas therebetween. The raised wall portions 86 are positioned inward of the aperture 71 of termination block base 28 such that when the bent tines 24 of the lead frame 4 are inserted into the aperture each tine has a free end portion thereof positioned in the receiving area between a different pair of the adjacent raised wall portions 86.

As noted above, the fully assembled termination block 2 is shown in FIG. 9 from the rear. Front views of the fully assembled termination block 2 are shown in FIGS. 10 and 11. The front face surface 62 of the termination block base 28 includes an aperture 88 within which the coated end portions 56 of the tines 24 of the lead frame 4 will be positioned for contact with the tines of a connector plug (not shown) when inserted into the aperture 88.

Figure 12:
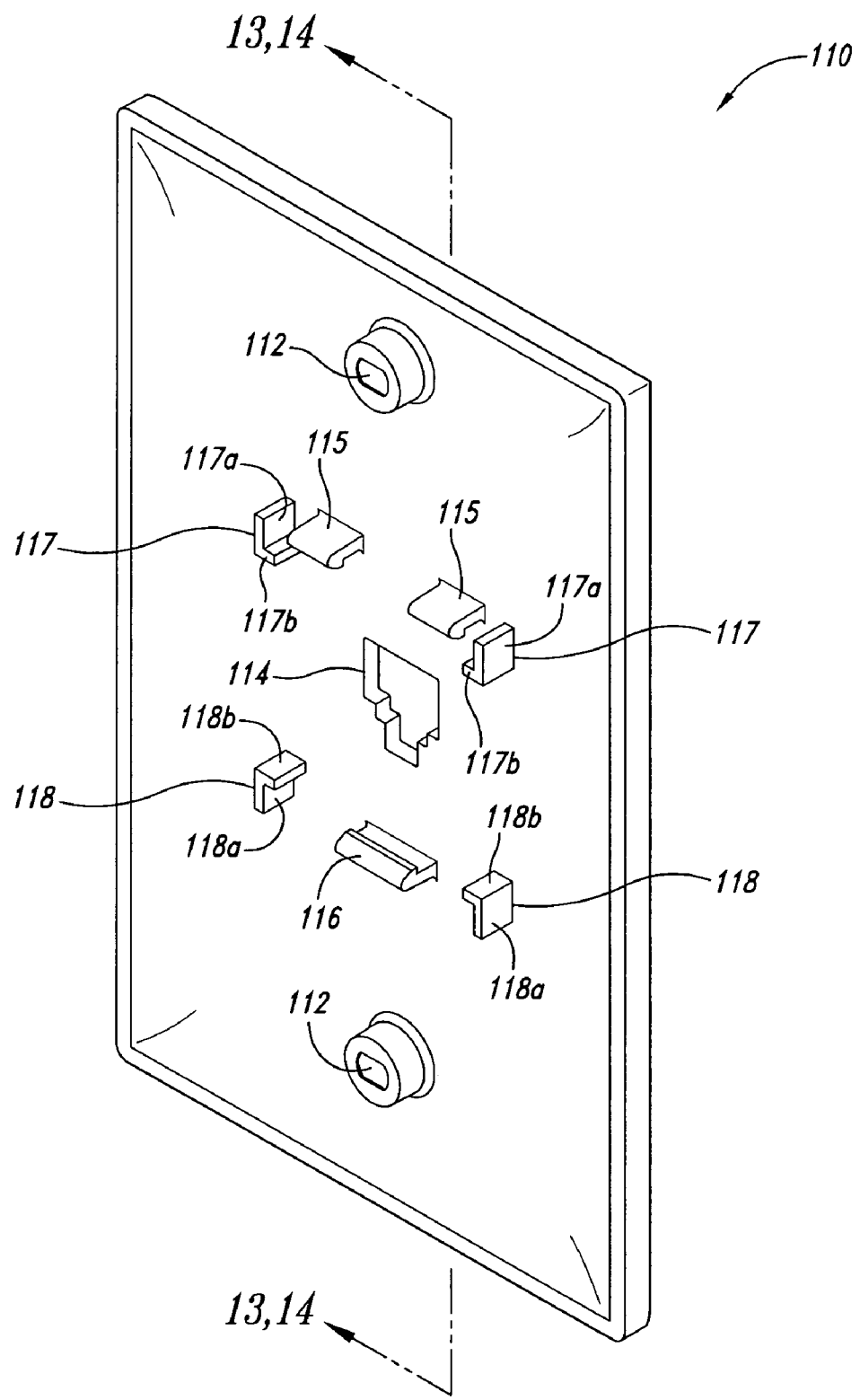
FIG. 12 is an isometric rear view of a single receptacle cover plate for use with the termination block of FIG. 9.
Figure 17:
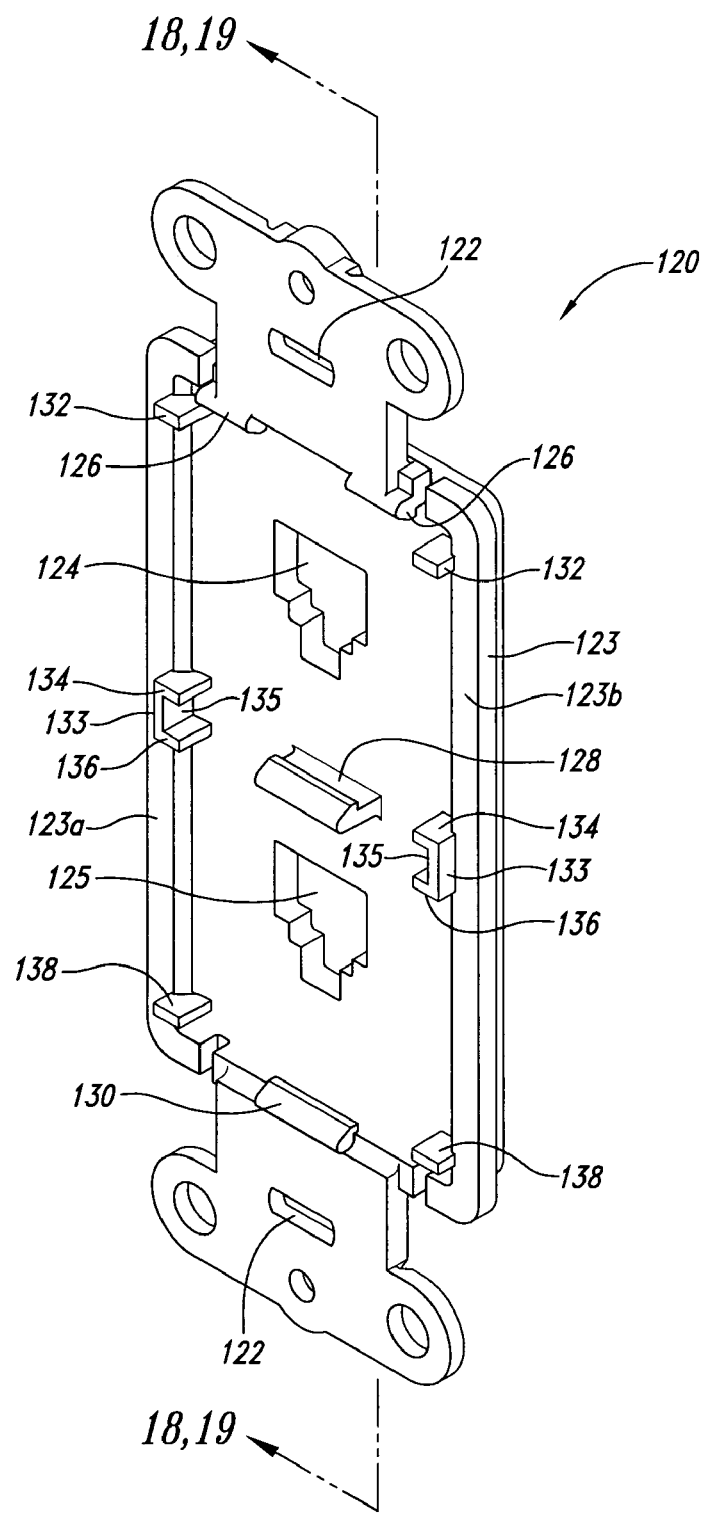
FIG. 17 is an isometric rear view of a dual block bracket.

The termination block 2 will now be discussed with respect to its mounting to cover plates and brackets, and as to other aspects of its design. As shown in FIGS. 9–11, the termination block base 28 has a side wall 102 and a side wall 104 at opposite sides thereof. Each of the side walls 102 and 104 has an exterior surface 107 which in part defines the side surfaces 64 and 66, respectively, of the termination block base 28, and interior surface 108. As shown in FIG. 9, the termination block base 28 has a pair of spaced apart, laterally extending block latch tabs 90 projecting outward from the exterior surface 107 of the side wall 102, at locations toward the front face surface 62, which are provided for mounting of the termination block 2 to a cover plate such as shown in FIG. 12 or a bracket such as shown in FIG. 17, as will be described in greater detail below. The termination block base 28 has a recess 91 located between the block tabs 90. As shown in FIG. 10, the termination block base 28 has a centrally positioned, laterally extending single block latch tab 98 projecting outward from the exterior surface 107 of the side wall 104, at a location toward the front face surface 62, and a pair of block latch recesses 100 in the exterior surface 107 of the side wall 104, at a location toward the front face surface 62 with the block tab 98 positioned therebetween. The block tab 98 is also provided to mount the termination block 2 to a cover plate or bracket. The block recesses 100 are spaced apart by the same distance as the block tabs 90 and used when two termination block bases 28 are mounted side by side to a cover plate or bracket, as will be described below.

The side walls 102 and 104 of the termination block base 28 each terminate in an end wall surface 106 which in part defines the front face surface 62 of the termination block base 28 and are the most forward portions of the front face surface. The end wall surfaces 106 of the side walls 102 and 104 are coplanar and, as will be described below, engage the rear face of the cover plate or bracket to which the termination block 2 is mounted.

A single receptacle cover plate 110 is shown from its rear face in FIG. 12 as having wall screw holes 112 for receiving screws to secure the single receptacle cover plate to a wall box (not shown). The receptacle cover plate 110 also includes a receptacle hole 114, which when a termination block 2 is mounted to the receptacle cover plate, aligns with the aperture 88 of the termination block base 28 and permits insertion of a connector plug into the aperture 88 from the front face of the receptacle cover plate for contact with the tines 24 of the lead frame 4.

Figure 13:
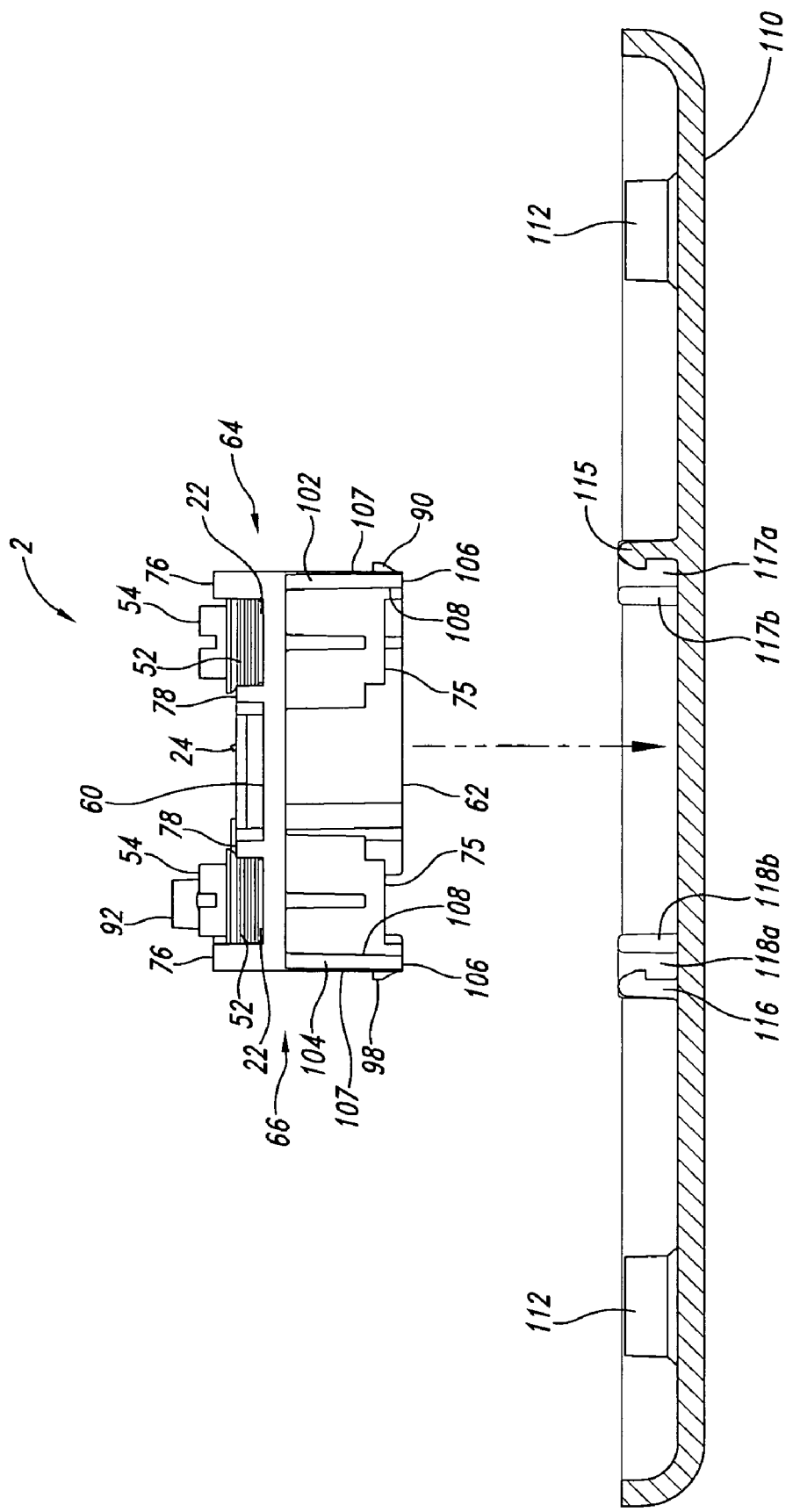
FIG. 13 is a cross-sectional side elevational view of the single receptacle cover plate of FIG. 12 showing the termination block ready for snap fitting to the single receptacle cover plate.
Figure 14:
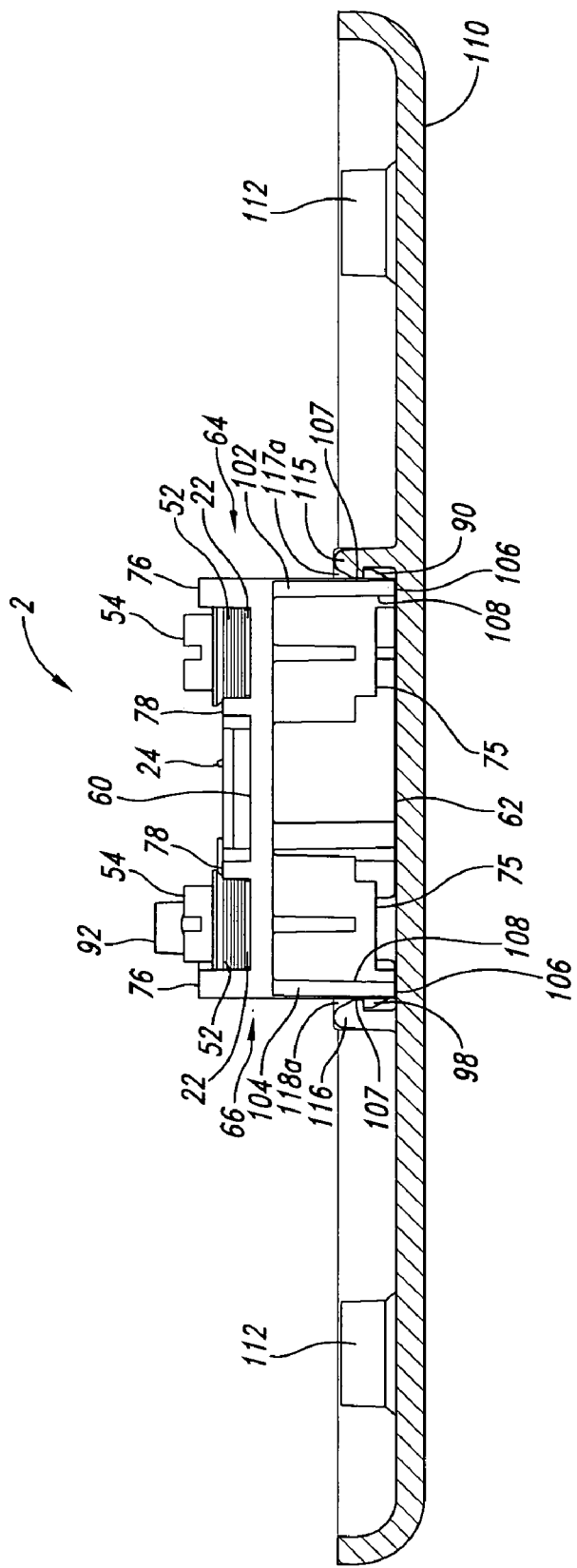
FIG. 14 is a cross-sectional side elevational view of the single receptacle cover plate of FIG. 12 showing the termination block fully inserted into the single receptacle cover plate.
Figure 15:
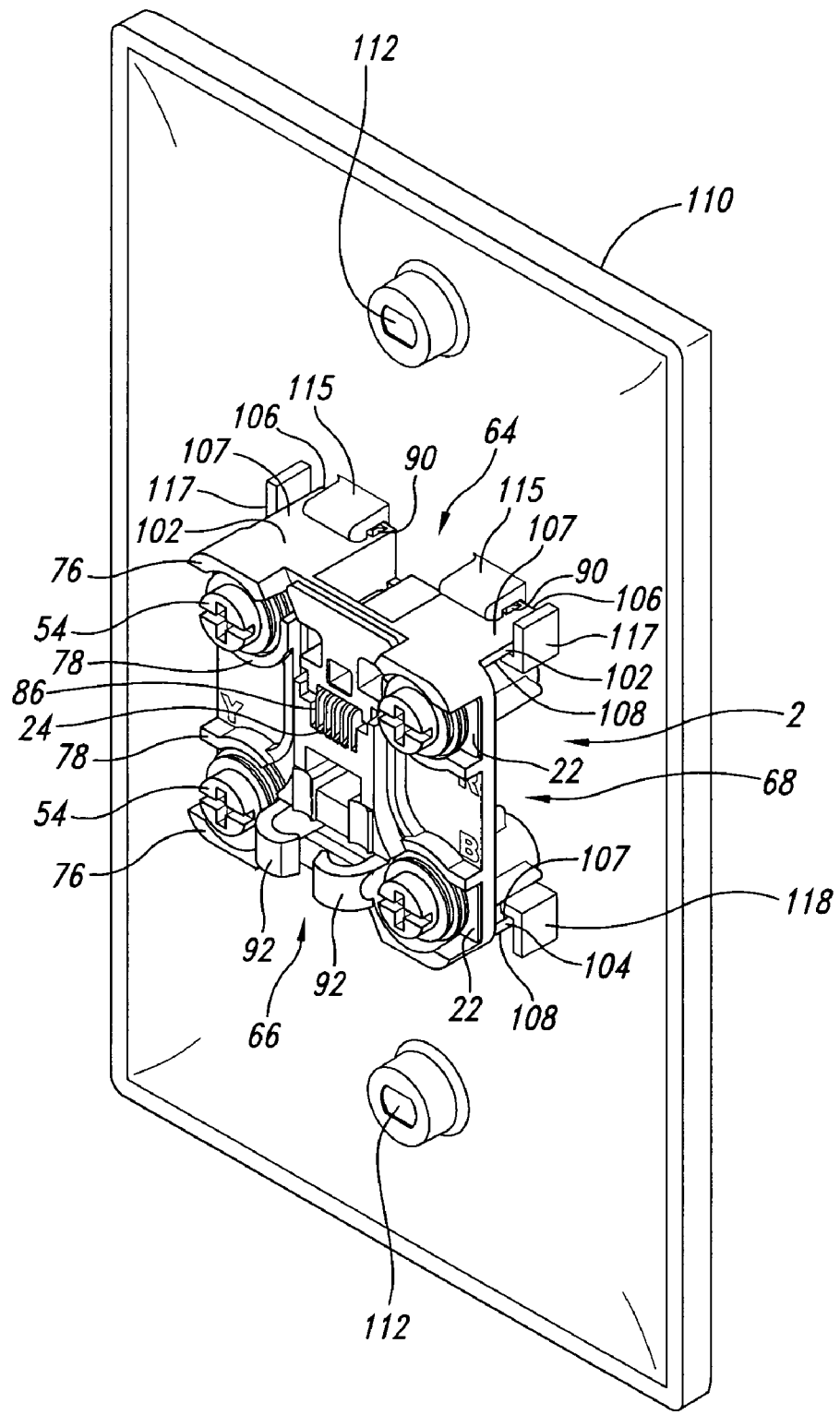
FIG. 15 is an isometric rear view of the single receptacle cover plate of FIG. 12 with the termination block fully inserted into the single receptacle cover plate.
Figure 16:
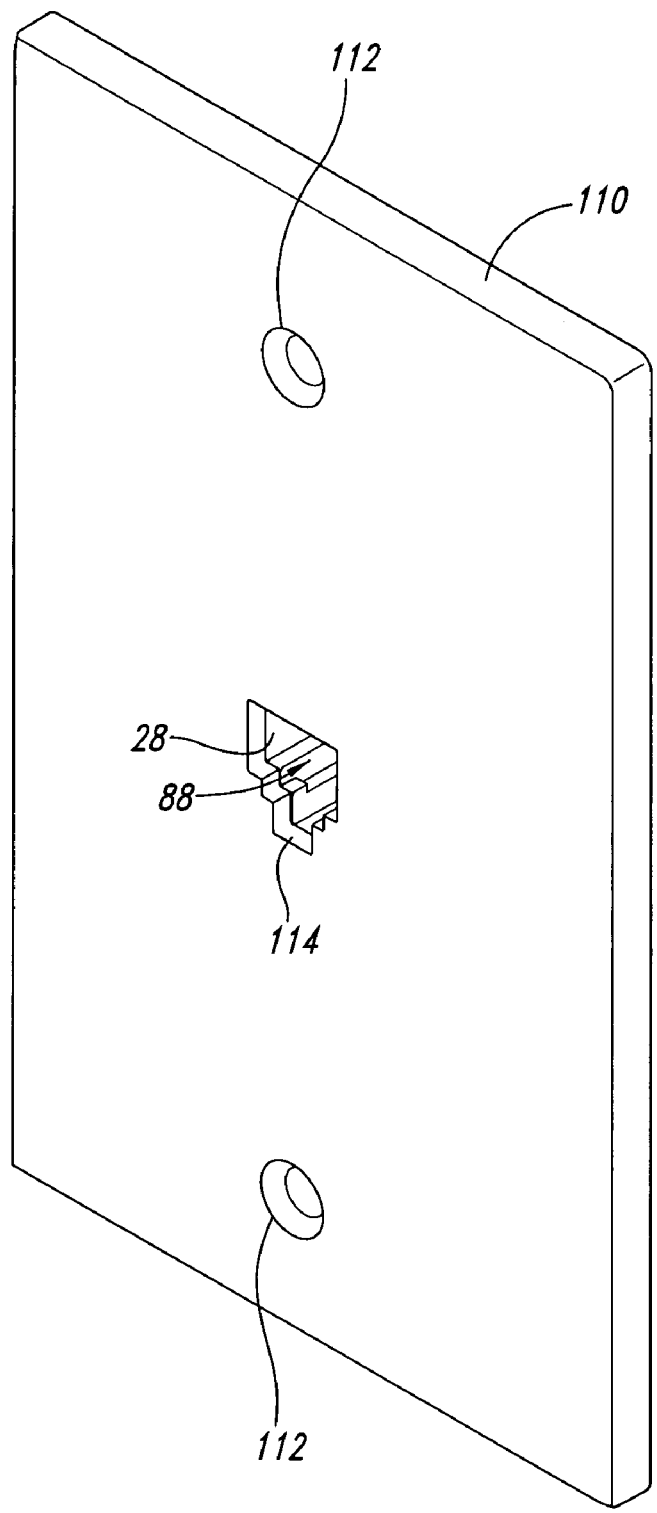
FIG. 16 is an isometric front view of the single receptacle cover plate of FIG. 12 with the termination block fully inserted into the single receptacle cover plate.

The receptacle cover plate 110 has projecting outward from the rear face thereof a pair of spaced apart, laterally extending cover latch tabs 115, each for releasably coupling with one of the pair of block tabs 90 of the termination block base 28 of the termination block 2 to be mounted to the receptacle cover plate, and a single laterally extending cover latch tab 116 for releasably coupling with the single block tab 98 of the termination block base 28. When snap fitted into place at the rear face of the receptacle cover plate 110, with the block tabs 90 and 98 longitudinally inward of and lockably engaging the corresponding cover tabs 115 and 116, engagement lips of the block tabs are positioned under opposing engagement lips of the corresponding cover tabs to hold the termination block base 28 in place against the rear face of the receptacle cover plate. The termination block base 28 of the termination block 2 is shown in FIG. 13 positioned to be snap fitted into place at the rear face of the receptacle cover plate 110, and is shown in FIGS. 14 and 15 snap fitted into place. When the termination block base 28 is fully snap fitted into place with the cover tabs 115 engaging the block tabs 90 and the cover tab 116 engaging the block tab 98, the end wall surfaces 106 of the side walls 102 and 104 of the termination block base engage the rear face of the receptacle cover plate. The front face of the receptacle cover plate 110 is shown in FIG. 16 with the termination block base 28 fully snap fitted into place with the receptacle hole 114 of the receptacle cover plate aligned with the aperture 88 of the termination block base 28 of the termination block 2 mounted to the receptacle cover plate ready for insertion of a connector plug into the aperture 88 for contact with the tines 24 of the lead frame 4 of the termination block.

Also projecting outward from the rear face of the receptacle cover plate 110 are a pair of tab retainers 117, each positioned laterally outward of one of the cover tabs 115 for securing the coupled connection of the cover tabs 115 with the block tabs 90. The tab retainers 117 each have an L-shape with a longitudinally extending wall 117a and a laterally extending wall 117b.

The longitudinally extending walls 117a of the tab retainers 117 are spaced apart to receive the side wall 102 of the termination block base 28 therebetween. When the termination block base 28 is mounted at the rear face of the receptacle cover plate by the cover tabs 115 coupling with the block tabs 90, the longitudinally extending walls 117a trap the side wall 102 therebetween and thereby prevent laterally outward movement of the termination block base relative to the receptacle cover plate.

The laterally extending walls 117b are positioned to engage the interior surface 108 of the side wall 102 and prevent longitudinal inward movement of the block tabs 90 away from the cover tabs 115 should the receptacle cover plate 110 be longitudinally flexed. This prevents disengagement of the block tabs 90 from the corresponding cover tabs 115 should flexing occur that could otherwise longitudinally separate the block tabs 90 from the cover tabs 115 and cause the termination block base 28 to unintentionally be disconnected from the receptacle cover plate 110.

The receptacle cover plate 110 also has projecting outward from its rear face a pair of tab retainers 118, each positioned laterally outward of the single cover tab 116 for securing the coupled connection of the cover tab 116 with the single block tab 98. The tab retainers 118 each have an L-shape with a longitudinally extending wall 118a and a laterally extending wall 118b.

The longitudinally extending walls 118a of the tab retainers 117 are spaced apart to receive the side wall 104 of the termination block base 28 therebetween. When the termination block base 28 is mounted at the rear face of the receptacle cover plate by the cover tab 116 coupling with the block tab 98, the longitudinally extending walls 118a trap the side wall 104 therebetween and thereby prevent laterally outward movement of the termination block base relative to the receptacle cover plate.

The laterally extending walls 118b are positioned to engage the interior surface 108 of the side wall 104 and prevent longitudinal inward movement of the block tab 98 away from the cover tab 116 should the receptacle cover plate 110 be longitudinally flexed. This prevents disengagement of the block tab 98 from the cover tab 116 should flexing occur that could otherwise longitudinally separate the block tab 98 from the cover tab 116 and cause the termination block base 28 to unintentionally be disconnected from the receptacle cover plate 110.

In the past, the possibility of flexure of a receptacle cover plate causing disconnection of a termination block base often resulted in the welding or cementing of the termination block base to the receptacle cover, or use of a metal strap surrounding the termination block, and thereby increased manufacturing cost. The flexure can result from a blow to a connector plug inserted into the aperture of the termination block base.

Figure 20:
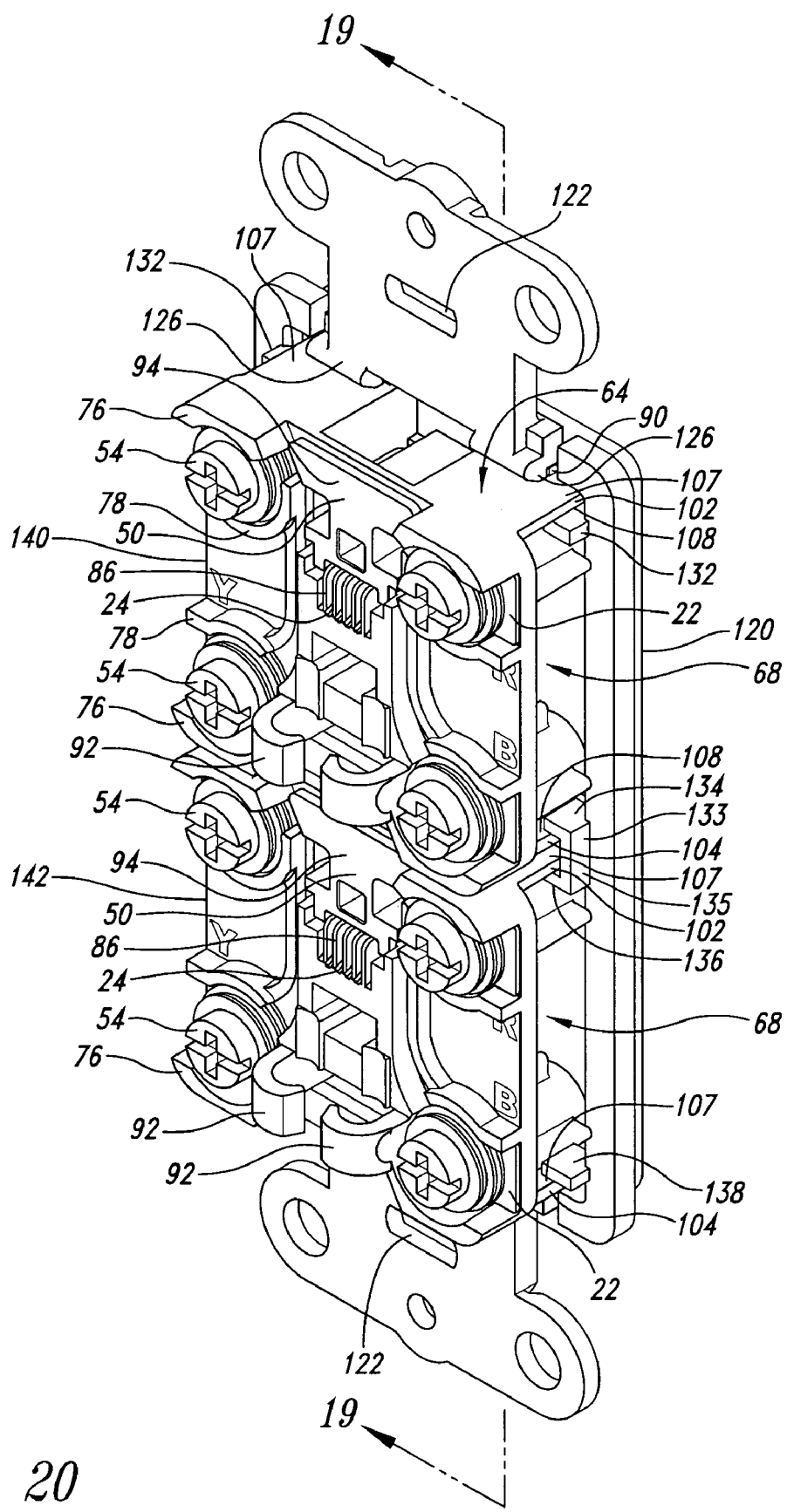
FIG. 20 is an isometric rear view of the dual block bracket of FIG. 17 with the first and second termination blocks fully inserted into the dual block bracket.

A duplex or dual block bracket 120 is shown from its rear face in FIG. 17 as having wall screw holes 122 for receiving screws to secure the dual block bracket to a wall box (not shown). The dual block bracket 120 is designed to have two of the termination blocks 2 described above mounted thereto. For clarity of description the two termination blocks will be referred to as first and second termination blocks 140 and 142 which are shown in FIG. 20 mounted to the dual block bracket 120. The dual block bracket 120 has first and second receptacle holes 124 and 125 which align with the apertures 88 of the termination block bases 28 of the first and second termination blocks 140 and 142 to permit insertion of a connector plug into each of the apertures 88 from the front face of the dual block bracket for contact with the tines 24 of the lead frame 4 of the termination block.

Figure 18:
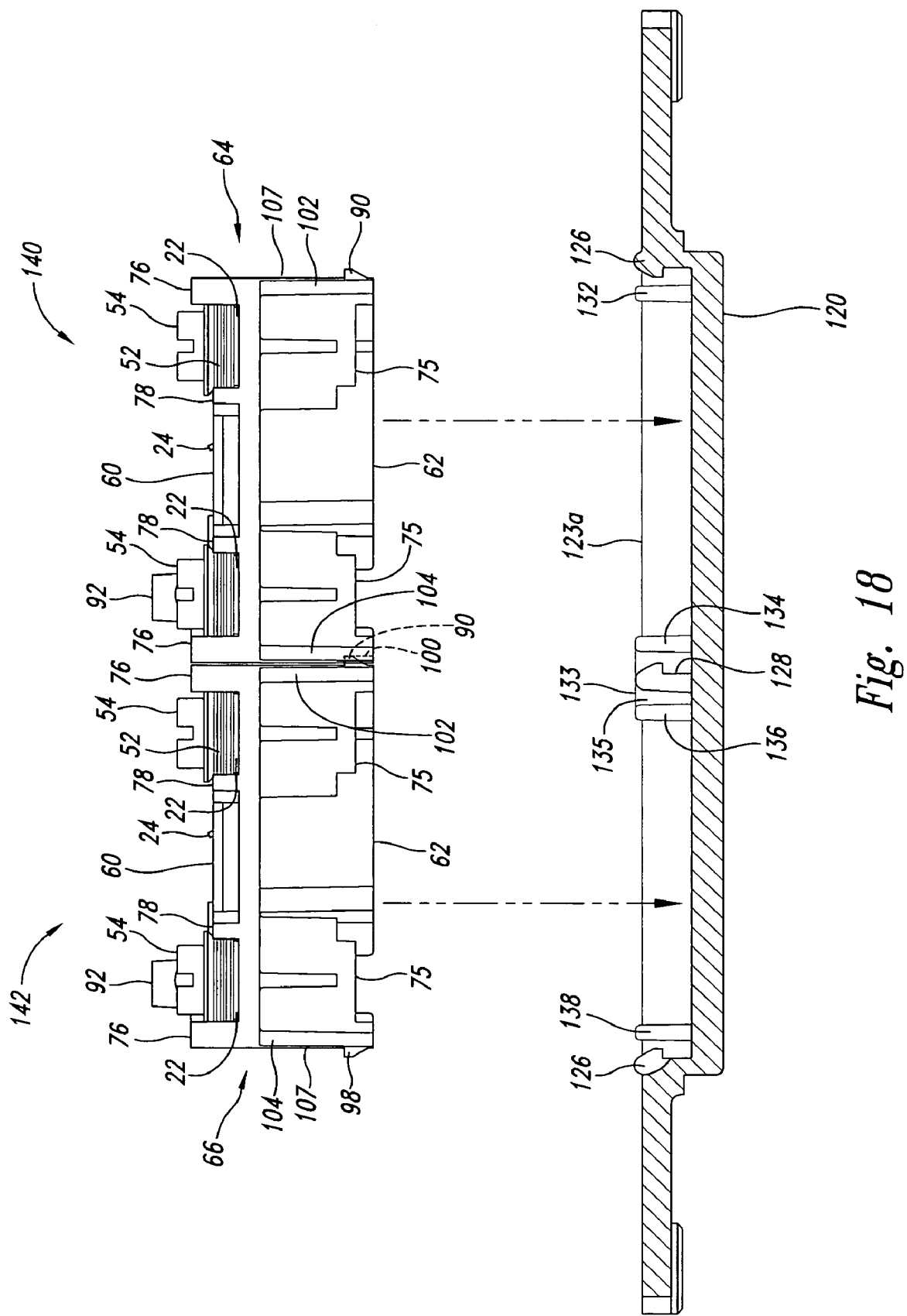
FIG. 18 is a cross-sectional side elevational view of the dual block bracket of FIG. 17 showing first and second termination blocks nested together and ready for snap fitting to the dual block bracket.

The termination block bases 28 of the first and second termination blocks 140 and 142 are shown in FIG. 18 nested together end-to-end, as will be described in greater detail below, and positioned to be simultaneously snap fitted into place at the rear face of the dual block bracket 120, and are shown in FIGS. 19–22 snap fitted into place.

The first and second termination blocks 140 and 142 are brought into the nested end-to-end position by placing the side wall 102 of the termination block base 28 of the second termination block 142 against the side wall 104 of the termination block base 28 of the first termination block 140 as shown in FIG. 18. When in this position, the block tabs 90 of the termination block base 28 of the second termination block 142 project into the block latch recesses 100 in the exterior surface 107 of the side wall 104 of the termination block base 28 of the first termination block 140 such that the side wall 102 of the termination block base of the second termination block is positioned immediately adjacent to the side wall 104 of the termination block base of the first termination block. Also when in this position, engagement lips of the block tabs 90 of the termination block base 28 of the second termination block 142 are positioned under opposing engagement lips of the corresponding block latch recesses 100 of the termination block base 28 of the first termination block 140. As will be described below, when the termination block bases 28 of the first and second termination blocks 140 and 142 are simultaneously snap fitted into place at the rear face of the dual block bracket 120, the block tabs 90 of the termination block base 28 of the second termination block 142 are in latching engagement with the block latch recesses 100 of the termination block base 28 of the first termination block 140 to hold the termination block base of the second termination block, at the location of the side wall 102 thereof, in place against the rear face of the dual block bracket 120. While the first and second termination blocks 140 and 142 are simultaneously snap fitted into place at the rear face of the dual block bracket 120, the connection of each to the dual block bracket will now be separately described starting with the manner of mounting of the termination block base 28 of the first termination block to the dual block bracket.

As best seen in FIG. 17, the rear face of the dual block bracket 120 has a perimeter wall 123 projecting outward with spaced apart, longitudinally extending side walls 123a and 123b extending the length of the dual block bracket. A pair of spaced apart, laterally extending bracket tabs 126 projects outward from the rear face of the dual block bracket 120 toward one end of the dual block bracket, each for releasably coupling with one of the pair of block tabs 90 of the termination block base 28 of the first termination block 140. A single laterally extending bracket tab 128 projects outward from the rear face of the dual block bracket 120 toward the middle of the dual block bracket for releasably coupling with the single block tab 98 of the termination block base 28 of the first termination block 140. When the first termination block 140 is snap fitted into place at the rear face of the dual block bracket 120, with the block tabs 90 and 98 longitudinally inward of and lockably engaging the corresponding bracket tabs 126 and 128, engagement lips of the block tabs are positioned under opposing engagement lips of the corresponding bracket tabs to hold the termination block base 28 of the first termination block 140 in place against the rear face of the dual block bracket.

When the termination block base 28 of the first termination block 140 is snap fitted into place with the bracket tabs 126 engaging the block tabs 90 and the bracket tab 128 engaging the block tab 98, the end wall surfaces 106 of the side walls 102 and 104 of the termination block base engage the rear face of the dual block bracket 120.

Also projecting outward from the rear face of the receptacle cover plate 110 are a pair of laterally extending tab retainers 132, each positioned laterally outward of one of the bracket tabs 126 for securing the coupled connection of the bracket tabs 126 with the block tabs 90. The longitudinally extending side walls 123a and 123b of the dual block bracket 120, in the vicinity of the tab retainers 132, are spaced apart to receive the side wall 102 of the termination block base 28 of the first termination block 140 therebetween. When the termination block base 28 of the first termination block 140 is mounted at the rear face of the dual block bracket 120 by the bracket tabs 126 coupling with the block tabs 90, the longitudinally extending side walls 123a and 123b trap the side wall 102 therebetween and thereby prevent laterally outward movement of the termination block base relative to the dual block bracket.

The laterally extending tab retainers 132 are positioned to engage the interior surface 108 of the side wall 102 of the termination block base 28 of the first termination block 140 and prevent longitudinal inward movement of the block tabs 90 away from the bracket tabs 126 should the dual block bracket 120 be longitudinally flexed. This prevents disengagement of the block tabs 90 from the corresponding bracket tabs 126 should flexing occur that could otherwise longitudinally separate the block tabs 90 from the bracket tabs 126 and cause the termination block base 28 to unintentionally be disconnected from the dual block bracket 120.

The dual block bracket 120 also has projecting outward from its rear face a pair of tab retainers 133, each positioned laterally outward of the single bracket tab 128 toward the middle of the dual block bracket for securing the coupled connection of the bracket tab 128 with the single block tab 98 of the termination block base 28 of the first termination block 140, and as will be described below, also for securing the coupled connection of the block tabs 90 of the termination block base 28 of the second termination block 142 with the block latch recesses 100 of the termination block base of the first termination block 140. The tab retainers 133 each have a U-shape oriented opening laterally inward with a pair of spaced apart, laterally extending walls 134 and 136, and a longitudinally extending wall 135.

The longitudinally extending walls 135 of the tab retainers 133 are spaced apart to receive the side wall 104 of the termination block base 28 of the first termination block 140 therebetween. When the termination block base 28 of the first termination block 140 is mounted at the rear face of the dual block bracket 120 by the bracket tab 128 coupling with the block tab 98, the longitudinally extending walls 135 trap the side wall 104 therebetween and thereby prevent laterally outward movement of the termination block base relative to the dual block bracket.

The laterally extending walls 134 of the tab retainers 133 are positioned to engage the interior surface 108 of the side wall 104 of the termination block base 28 of the first termination block 140 and prevent longitudinal movement of the block tab 98 away from the bracket tab 128 should the dual block bracket 120 be longitudinally flexed. This prevents disengagement of the block tab 98 from the bracket tab 128 should flexing occur that could otherwise longitudinally separate the block tab 98 from the bracket tab 128 and cause the termination block base 28 of the first termination block 140 to unintentionally be disconnected from the dual block bracket 120.

The manner of mounting of the termination block base 28 of the second termination block 142 to the dual block bracket 120 will now be described. A single laterally extending bracket tab 130 projects outward from the rear face of the dual block bracket 120 toward the end of the dual block bracket away from the bracket tabs 126 for releasably coupling with the block tab 98 of the termination block base 28 of the second termination block 142. As previously described, when the first and second termination blocks 140 and 142 are brought into the nested end-to-end position for simultaneous snap fitting into place at the rear face of the dual block bracket 120, the block tabs 90 of the termination block base 28 of the second termination block 142 project into the block latch recesses 100 in the exterior surface 107 of the side wall 104 of the termination block base 28 of the first termination block 140. The block tabs 90 of the termination block base 28 of the second termination block 142 are in latching engagement with the block latch recesses 100 in the exterior surface 107 of the side wall 104 of the termination block base 28 of the first termination block 140 for releasably coupling with the block tabs 90 of the termination block base of the second termination block to the block latch recesses 100 of the termination block base of the first termination block. As such, the termination block base 28 of the first termination block 140 is held in place against the rear face of the dual block bracket 120 by the bracket tabs 126 and 128, and the termination block base 28 of the second termination block 142 is held in place against the rear face of the dual block bracket 120 by the bracket tab 130 and the block latch recesses 100.

Figure 19:
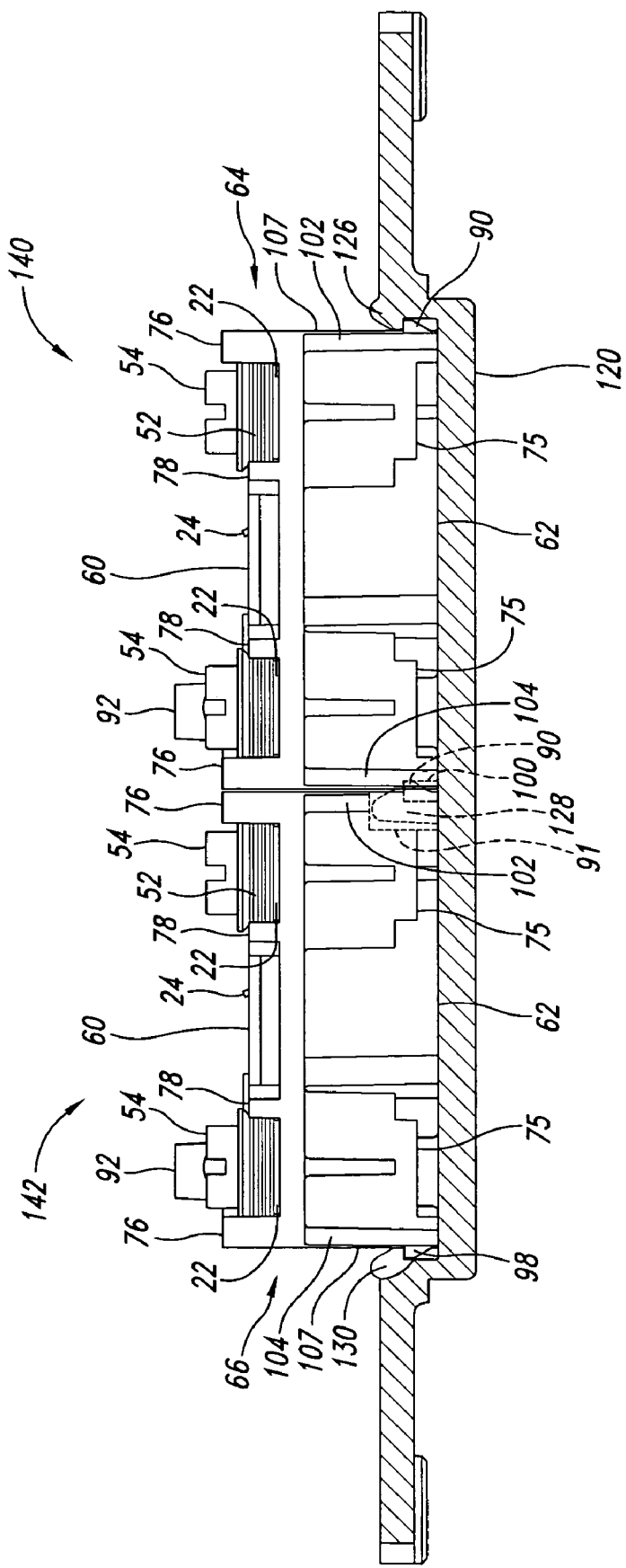
FIG. 19 is a cross-sectional side elevational view of the dual block bracket of FIG. 17 showing the first and second termination blocks fully inserted into the dual block bracket.

The recess 91 in the termination block base 28 of the second termination block 142, located between the block tabs 90 thereof, is sufficiently large to receive therein the bracket tab 128 and thereby allow the side wall 102 of the termination block base 28 of the second termination block 142 to be positioned immediately adjacent to the side wall 104 of the termination block base 28 of the first termination block 140, as can be seen in FIG. 19. This flush mounting of the two termination block bases without space therebetween is also facilitated by utilizing the block latch recesses 100 in the first termination block 140 to lockably receive the block tabs 90 of the second terminal block 142 rather than utilizing a set of bracket tabs, such as the bracket tabs 126 used to engage the block tabs 90 of the first terminal block. The resulting dual block bracket 120 has a shortened length than prior dual block bracket designs.

When the second termination block 142 is snap fitted into place at the rear face of the dual block bracket 120, with the block tabs 90 and 98 lockably engaging the corresponding block latch recesses 100 of the first termination block 142 and the bracket tab 130, respectively, engagement lips of the block tabs are positioned under opposing engagement lips of the corresponding block latch recesses of the first termination block and the bracket tab 130 to hold the termination block base 28 of the second termination block 142 in place against the rear face of the dual block bracket.

Figure 21:
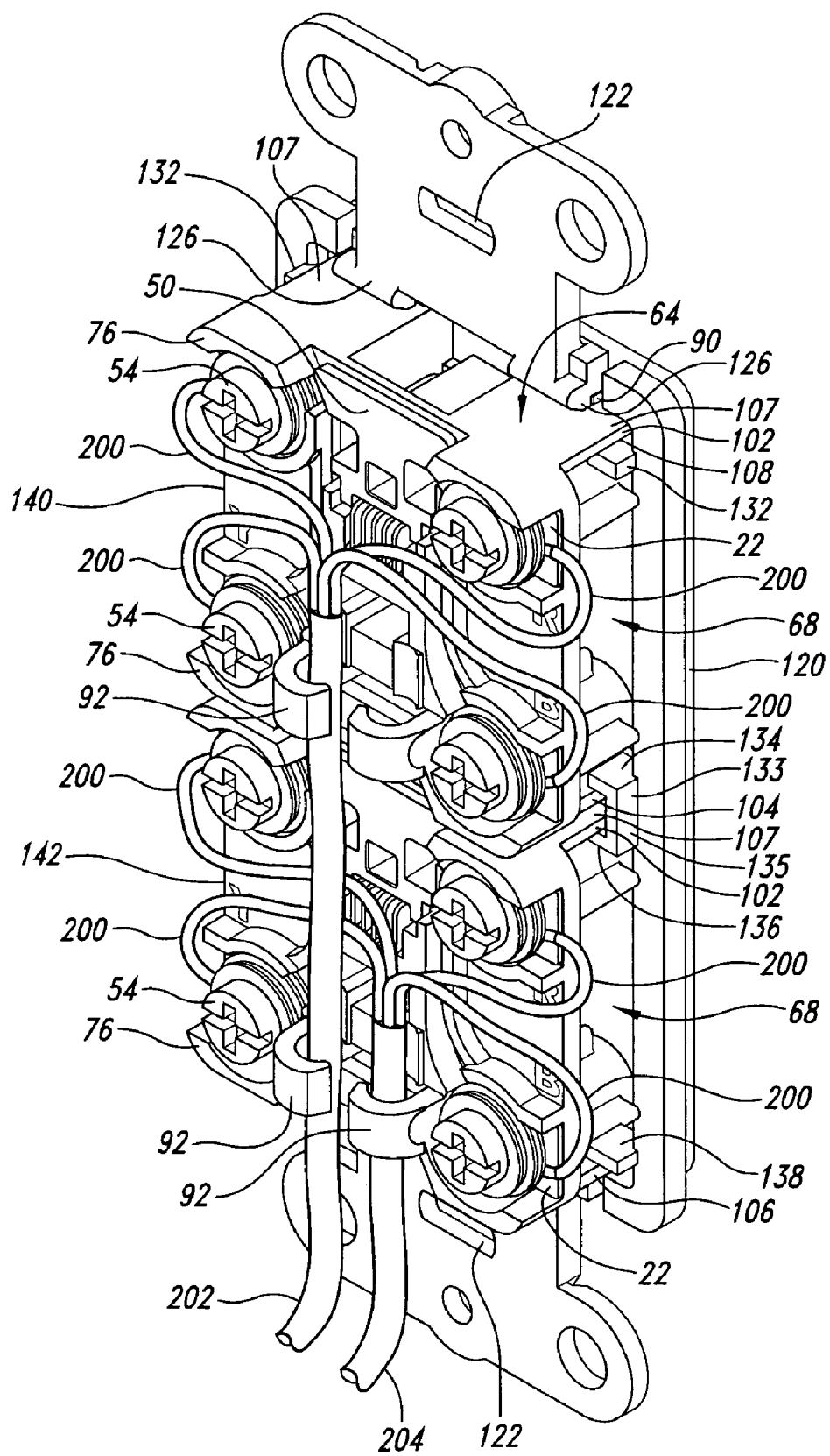
FIG. 21 is an isometric rear view of the dual block bracket of FIG. 17 with the first and second termination blocks fully inserted into the dual block bracket shown with telephone network wires attached.

When the termination block base 28 of the second termination block 142 is snap fitted into place with the block tabs 90 engaging the block latch recesses 100 of the first termination block 140 and the bracket tab 128 engaging the block tab 98, the end wall surfaces 106 of the side walls 102 and 104 of the termination block base engage the rear face of the dual block bracket 120. In FIG. 21, the first and second termination blocks 140 and 142 are shown with wires 200 of telephone network cables 202 and 204, respectively, attached to the terminal connection pads 22 of the lead frames 4 of the termination blocks using the screws 52.

As noted above, the tab retainers 133 of the dual block bracket 120 are provided for also securing the coupled connection of the block tabs 90 of the termination block base 28 of the second termination block 142 with the block latch recesses 100 of the termination block base of the first termination block 140. The longitudinally extending walls 135 of the tab retainers 133 are spaced apart to receive the side wall 102 of the termination block base 28 of the second termination block 142 therebetween. When the termination block base 28 of the second termination block 142 is mounted at the rear face of the dual block bracket 120 by the block tab 98 coupling with the block latch recesses 100 of the first termination block 140, the longitudinally extending walls 135 trap the side wall 102 therebetween and thereby prevent laterally outward movement of the termination block base relative to the dual block bracket.

The laterally extending walls 136 of the tab retainers 133 are positioned to engage the interior surface 108 of the side wall 102 of the termination block base 28 of the second termination block 142 and prevent longitudinal movement of the block tabs 90 away from the block latch recesses 100 of the first termination block 140 should the dual block bracket 120 be longitudinally flexed. This prevents disengagement of the block tabs 90 from the block latch recesses 100 of the first termination block 140 should flexing occur that could otherwise longitudinally separate the block tabs from the block latch recesses of the first termination block and cause the termination block base 28 of the second termination block 142 to unintentionally be disconnected from the dual block bracket 120.

As for the receptacle cover plate 110 discussed above, in the past the possibility of flexure of a dual block bracket causing disconnection of the termination block bases of the termination blocks often resulted in the welding or cementing of the termination block bases to the dual block bracket, or use of a metal strap surrounding the termination blocks, and thereby increased manufacturing cost.

Figure 22:
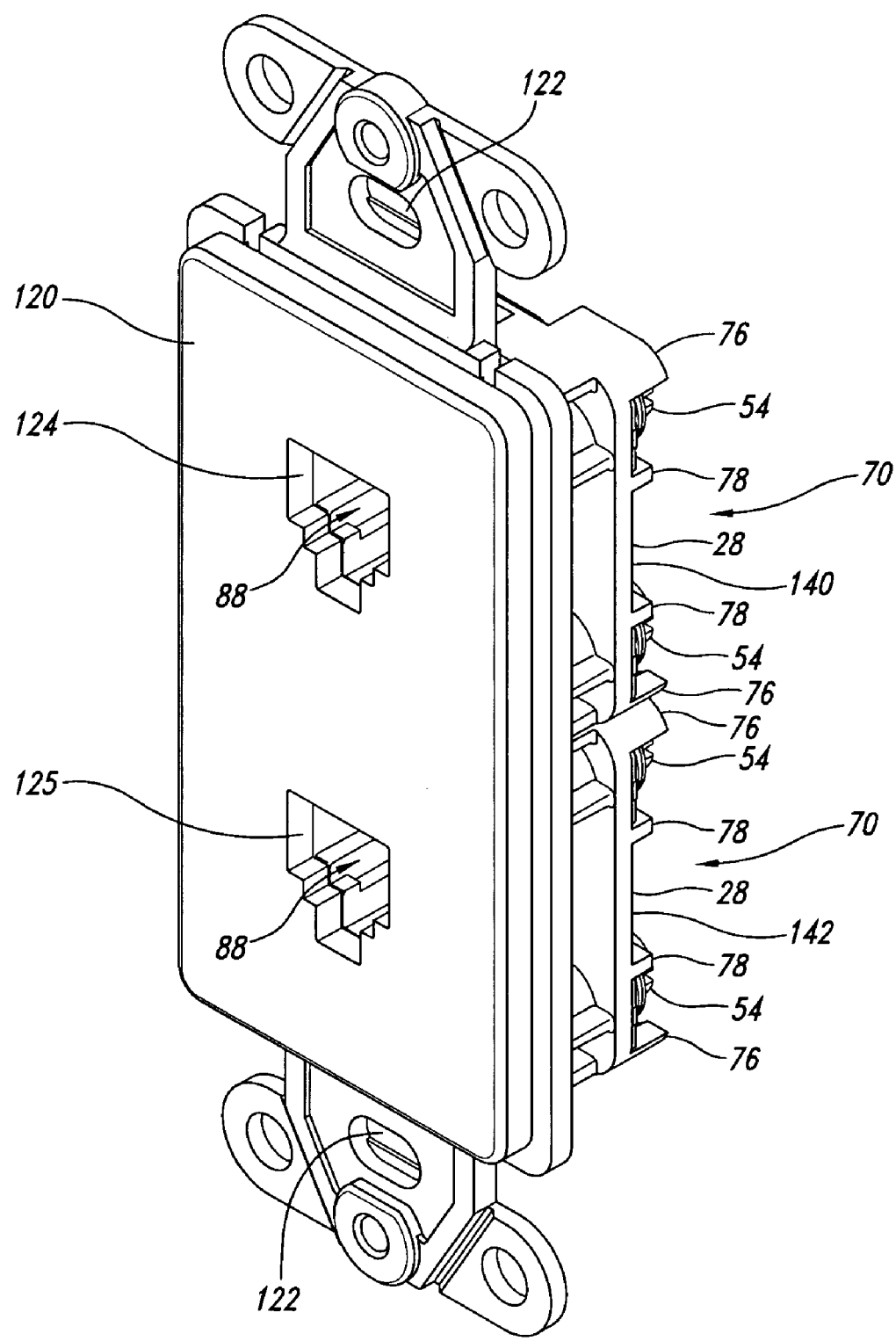
FIG. 22 is an isometric front view of the dual block bracket of FIG. 17 with the first and second termination blocks fully inserted into the dual block bracket.

The front face of the dual block bracket 120 is shown in FIG. 22 with the termination block bases 28 of the first and second termination blocks 140 and 142 fully snap fitted into place with the receptacle holes 124 and 125 of the dual block bracket aligned with the apertures 88 of the termination block bases of the first and second termination blocks mounted to the dual block bracket ready for insertion of a connector plug into each of the apertures 88 for contact with the tines 24 of the lead frame 4 of the termination block.

Figure 23:
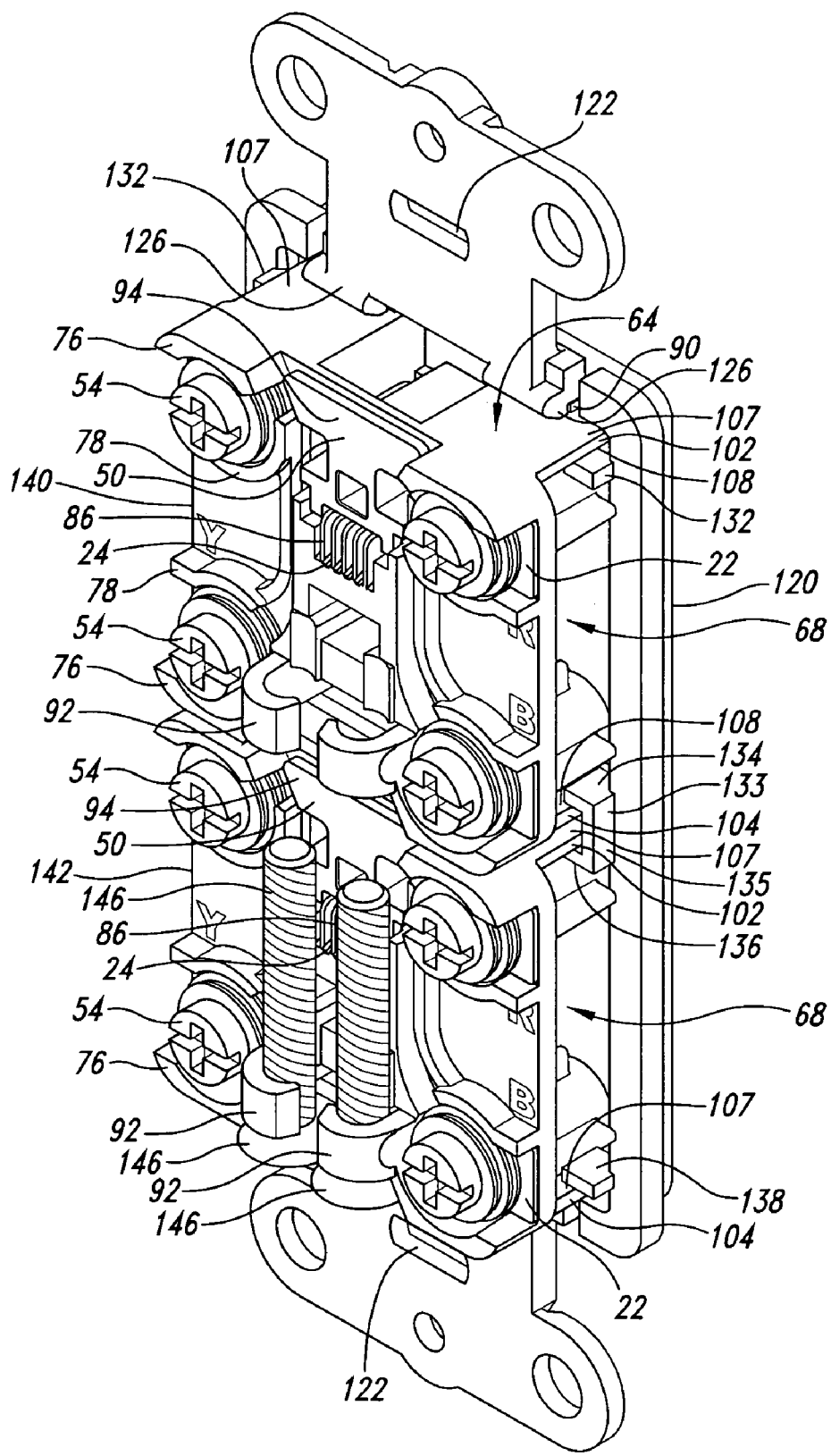
FIG. 23 is an isometric rear view of the dual block bracket of FIG. 17 with the first and second termination blocks fully inserted into the dual block bracket shown with two mounting screws being held by the screw retainers on the second termination block for shipping.

The termination block 2 includes a pair of hooked shaped screw retainers 92 projecting rearward from the rear face surface 60 of the termination block base 28 which, during shipment of the termination block, each may hold a screw 146 as illustrated in FIG. 23. For the dual block bracket 120 shown in FIG. 23 with the first and second termination blocks 140 and 142 attached thereto, only the second termination block is provided with the two screws 146 needed for insertion through the wall screw holes 122 to secure the dual block bracket 120 to a wall box (not shown). The screw retainers 92 of the first termination block 140 remain empty. While not illustrated for a single receptacle cover plate 110, the two screw retainers 92 of the single termination block 2 shown in FIG. 12 may hold the two screws 146 needed for insertion through the wall screw holes 112 to secure the single receptacle cover plate to a wall box (not shown).

The screws 146 may be easily removed at the time of installation of the termination block 2 and, as noted above, used to fasten the receptacle cover plate 110 or dual block bracket 120 to a wall box. After the screws 146 are removed from the screw retainers 92, the telephone network cables 202 and 204 can be pushed under and retained by the screw retainers 92 as shown in FIG. 21 for the dual block bracket 120. Thus, the screw retainers 92 can serve a second purpose as cable strain reliefs upon installation of the termination blocks 2.

Figure 24:
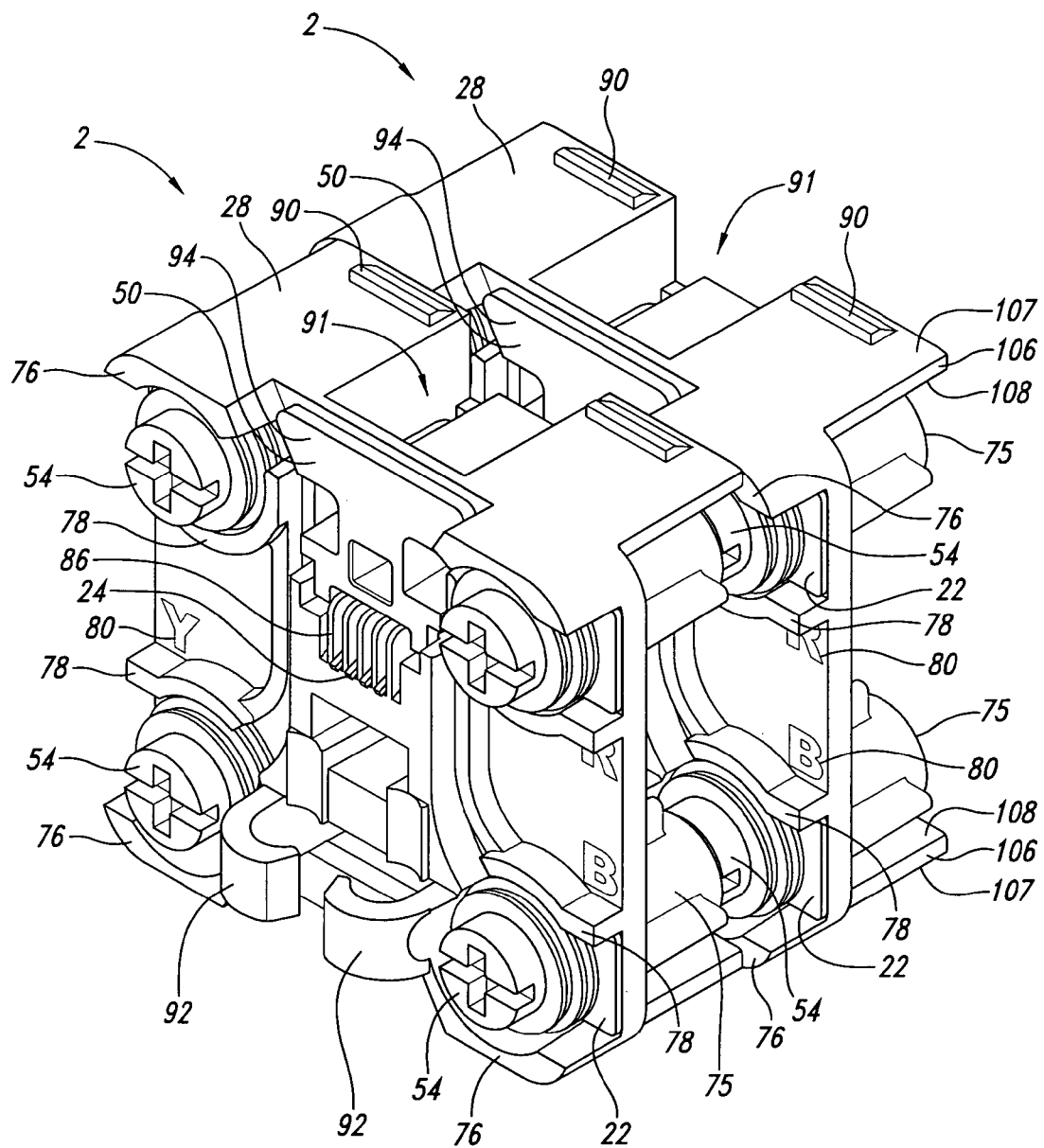
FIG. 24 is an isometric rear view of a pair of termination blocks stacked for shipment or storage purposes.

As illustrated in FIG. 24, the termination blocks 2 may be stacked one above the other for shipment and storage without damage. This is accomplished because the four raised supports 76 of the rear face surface 60 of the termination block base 28 of each termination block 2 are positioned to engage and support the end wall surfaces 106 of the side walls 102 and 104 of another termination block base stacked thereabove. Their combined lengths provide sufficient standoff to prevent the screws 52 of the bottom one from contacting the termination block above it. This prevents the color marking paint applied to the screw heads 54 of the screw 52 from being damaged.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A termination block comprising:
   a termination block base including:
      a rear face having a rear aperture;
      a front face having a front aperture, the front face being spaced from the rear face;
      a plurality of mounting surfaces on the rear face;
      a plurality of screw receiving portions, each positioned at one of the mounting surfaces and having an opening and a screw receiver extending from the rear face toward the front face; and
      an interior space between the rear and front faces and accessible from the rear face through the rear aperture and accessible from the front face through the front aperture;
   a plurality of screws, each extending through the opening of one of the screw receiving portions and threadably received in the screw receiver thereof;
   a lead frame of flat metal having a plurality of separate circuit portions and positioned at the rear face of the termination block base, each circuit portion including:
      a terminal connection portion positioned at one of the mounting surfaces of the termination block base, each terminal connection portion having a screw aperture therethrough positioned in alignment with the opening of the screw receiving portion positioned at the mounting surface and one of the screws extending through the screw aperture;
      a bent tine portion extending through the rear aperture of the rear face and positioned within the interior space of the termination block base and positioned for access through the front aperture, the bent tine portion having a contact end portion, the contact end portions of the bent tine portions of the plurality of circuit portions being in spaced apart arrangement in position within the interior space of the termination block base; and
      a trace member portion electrically coupling together the terminal connection portion and the bent tine portion; and
   a plug extending through the rear aperture of the rear face of the termination block base and within the interior space of the termination block base and holding the bent tine portions of the plurality of circuit portions in spaced apart arrangement.

2. The termination block of claim 1 wherein each of the plurality of screws has a head portion and the screw is threadably movable into the screw receiver of the screw receiving portion positioned at the mounting surface at which the terminal connection portion of the circuit portion is positioned to securely hold the terminal connection portion to the rear face of the termination block base.

3. The termination block of claim 1 wherein the plug has a plurality of channels, each having one of the bent tine portions of the plurality of circuit portions positioned therein.

4. The termination block of claim 3 wherein the plug holds the bent tine portions of the plurality of circuit portions in spaced apart, generally planar arrangement.

5. The termination block of claim 1 wherein the plug has a cover portion extending over a portion of the rear face of the termination block and covering at least a portion of the trace member portions of the plurality of circuit portions.

6. The termination block of claim 1 wherein the termination block base further includes rear raised portions positioned adjacent to the terminal connection portions of the plurality of circuit portions and extending from the rear face rearward beyond the terminal connection portions of the plurality of circuit portions.

7. The termination block of claim 6 wherein the termination block base further includes a plurality of forwardly projecting front support members, the front support members being positioned to engage at least a portion of the rear raised portions of another termination block when two termination blocks are positioned in engagement with the front face toward the rear face of the another termination block, the combined length of the front support members and the portions of the rear raised portions in engagement being sufficient to keep the front face from contacting the rear face of the another termination block, whereby damage to the screws is prevented during face to face shipment or storage of the termination blocks.

8. The termination block of claim 1 wherein the termination block base further includes rear raised portions positioned adjacent to the trace member portions of the plurality of circuit portions and extending from the rear face rearward beyond the trace member portions of the plurality of circuit portions with the trace member portions positioned therebetween.

9. The termination block of claim 1 further including a plurality of spaced apart channels at the rear face of the termination block base, each of the channels receiving a free end portion of one of the bent tine portions of the plurality of circuit portions.

10. The termination block of claim 1 wherein the contact end portion of each of the bent tine portions of the plurality of circuit portions has a flat forward facing contact surface with a coating of conductive metal thereon and the other portions of the contact end portion are uncoated.

11. The termination block of claim 1 arranged for carrying a mounting screw, the termination block further including a screw retainer extending rearward from the rear face of the termination block base and sized to removably retain the mounting screw.

12. The termination block of claim 11 for use with a wire cable having wires to be connected to the terminal connection portions of the plurality of circuit portions, the screw retainer being sized to retain the cable when the screw is removed therefrom to serve as a cable strain relief.

13. A termination block comprising:
a termination block base including:
   a rear face having a rear aperture;
   a front face having a front aperture, the front face being spaced from the rear face;
   a plurality of mounting surfaces on the rear face;
   a plurality of screw receiving portions, each positioned at one of the mounting surfaces and having an opening and a screw receiver extending from the rear face toward the front face; and
   an interior space between the rear and front faces and accessible from the rear face through the rear aperture and accessible from the front face through the front aperture;
a plurality of screws, each extending through the opening of one of the screw receiving portions and threadably received in the screw receiver thereof; and
a lead frame of flat metal having a plurality of separate circuit portions and positioned at the rear face of the termination block base, each circuit portion including:
   a terminal connection portion positioned at one of the mounting surfaces of the termination block base, each terminal connection portion having a screw aperture therethrough positioned in alignment with the opening of the screw receiving portion positioned at the mounting surface and one of the screws extending through the screw aperture;
   a bent tine portion extending through the rear aperature of the rear face and positioned within the interior space of the termination block base and positioned for access through the front aperture, the bent tine portion having a contact end portion, the contact end portions of the bent tine portions of the plurality of circuit portions being in spaced apart arrangement in position within the interior space of the termination block base; and
   a trace member portion electrically coupling together the terminal connection portion and the bent tine portion; and
wherein the bent tine portions of the plurality of circuit portions springably engage a portion of the rear face of the termination block base to generate a forwardly directed tension force.

14. The termination block of claim 13 further including a plurality of spaced apart channels at the rear face of the termination block base and wherein a free end portion of one of the bent tine portions is positioned in each of the channels.

15. A termination block comprising:
a termination block base including:
   a rear face having a rear aperture;
   a front face having a front aperture, the front face being spaced from the rear face;
   a plurality of mounting surfaces on the rear face;
   a plurality of screw receiving portions, each positioned at one of the mounting surfaces and having an opening and a screw receiver extending from the rear face toward the front face; and
   an interior space between the rear and front faces and accessible from the rear face through the rear aperture and accessible from the front face through the front aperture;
a plurality of screws, each extending through the opening of one of the screw receiving portions and threadably received in the screw receiver thereof; and
a lead frame of flat metal having a plurality of separate circuit portions and positioned at the rear face of the termination block base, each circuit portion including:
   a terminal connection portion positioned at one of the mounting surfaces of the termination block base, each terminal connection portion having a screw aperture therethrough positioned in alignment with the opening of the screw receiving portion positioned at the mounting surface and one of the screws extending through the screw aperture;
   a bent tine portion extending through the rear aperature of the rear face and positioned within the interior space of the termination block base and positioned for access through the front aperture, the bent tine portion having a contact end portion, the contact end portions of the bent tine portions of the plurality of circuit portions being in spaced apart arrangement in position within the interior space of the termination block base; and
   a trace member portion electrically coupling together the terminal connection portion and the bent tine portion; and
a plug extending through the rear aperture of the rear face of the termination block base and within the interior space of the termination block base, and applying a forward force to the bent tine portions of the plurality of circuit portions to generate a forwardly directed tension force in the bent tine portions.

16. The termination block of claim 15 further including a plurality of spaced apart channels at the rear face of the termination block base, and wherein a free end portion of one of the bent tine portions is positioned in each of the channels.

17. A termination block arranged for carrying first and second mounting screws, the termination block comprising:
a termination block base including:
   a rear face having a rear aperture;
   a front face having a front aperture, the front face being spaced from the rear face;
   a plurality of mounting surfaces on the rear face;
   a plurality of screw receiving portions, each positioned at one of the mounting surfaces and having an opening and a screw receiver extending from the rear face toward the front face; and
   an interior space between the rear and front faces and accessible from the rear face through the rear aperture and accessible from the front face through the front aperture;
a plurality of screws, each extending through the opening of one of the screw receiving portions and threadably received in the screw receiver thereof;
a lead frame of flat metal having a plurality of separate circuit portions and positioned at the rear face of the termination block base, each circuit portion including:
   a terminal connection portion positioned at one of the mounting surfaces of the termination block base, each terminal connection portion having a screw aperture therethrough positioned in alignment with the opening of the screw receiving portion positioned at the mounting surface and one of the screws extending through the screw aperture;
   a bent tine portion extending through the rear aperature of the rear face and positioned within the interior space of the termination block base and positioned for access through the front aperture, the bent tine portion having a contact end portion, the contact end portions of the bent tine portions of the plurality of circuit portions being in spaced apart arrangement in position within the interior space of the termination block base; and a trace member portion electrically coupling together the terminal connection portion and the bent tine portion; and first and second screw retainers extending rearward from the rear face of the termination block base, each of the first and second screw retainers being sized to removably retain one of the first and second mounting screws.

18. The termination block of claim 17 mountable to a mounting member having first and second spaced apart mounting holes in the mounting member to receive the first and second mounting screws, respectively, inserted therethrough, the termination block base further including opposed first and second opposite sides positionable toward the first and second mounting holes in the mounting member, respectively, the first and second screw retainers being arranged to hold the first and second mounting screws with an orientation extending between the first and second sides of the termination block base.

19. The termination block of claim 18 for use with a wire cable having wires to be connected to the terminal connection portions of the plurality of circuit portions, at least one of the first and second screw retainers being sized to retain the cable when the screw is removed therefrom to serve as a cable strain relief.

20. The termination block of claim 19 for use with another termination block connected to another wire cable having wires to be connected to the terminal connection portions of the plurality of circuit, portions of the another termination block, wherein the other one of the first and second screw retainers is sized to retain the another cable when the screw is removed therefrom to serve as a cable strain relief.

21. A termination block comprising:
a rear face with a rear aperture;
a front face with a front aperture, the front and rear faces being spaced apart;
a plurality of mounting surfaces on the rear face;
a plurality of screw receiving portions, each positioned at one of the mounting surfaces and having an opening and a screw receiver extending from the rear face toward the front face;
an interior recess between the rear and front faces and accessible from the rear face through the rear aperture and accessible from the front face through the front aperture;
a plurality of screws, each extending through the opening of one of the screw receiving portions and threadably received in the screw receiver thereof;
a plurality of terminal connection pads positioned at the rear face at one of the mounting surfaces, each terminal connection pad having a screw aperture therethrough positioned in alignment with the opening of the screw receiving portion positioned at the mounting surface and one of the screws extending through the screw aperture;
a plurality of tines extending through the rear aperture of the rear face and positioned within the interior recess and positioned for access through the front aperture, each tine having a contact end portion, the contact end portions of the tines being in spaced apart arrangement in position within the interior recess;
a plurality of trace members positioned at the rear face, each trace member electrically coupling together one of the terminal connection pads and one of the tines; and
a plug extending through the rear aperture of the rear face and within the interior recess and holding the tines in spaced apart arrangement, the plug having a cover portion extending over a portion of the rear face and covering at least a portion of the trace members.

22. The termination block of claim 21 wherein each of the plurality of screws has a head portion and the screw is threadably movable into the screw receiver of the screw receiving portion positioned at the mounting surface at which the terminal connection pad is positioned to hold the terminal connection pad secured to the rear face.

23. The termination block of claim 21 wherein the plug has a plurality of channels, each having one of the tines positioned therein.

24. The termination block of claim 23 wherein the plug holds the tines in spaced apart, generally planar arrangement.

25. The termination block of claim 21 further including at least one rear raised portion positioned adjacent to each of the terminal connection pads and extending from the rear face rearward beyond the adjacent terminal connection pad.

26. The termination block of claim 25 further including a plurality of forwardly projecting front support members, the front support members being positioned to engage at least a portion of the rear raised portions of another termination block when two termination blocks are positioned in engagement with the front face toward the rear face of the another termination block, the combined length of the front support members and the portions of the rear raised portions in engagement being sufficient to keep the front face from contacting the rear face of the another termination block, whereby damage to the screws is prevented during face to face shipment or storage of the termination blocks.

27. The termination block of claim 21 further including rear raised portions positioned adjacent to the trace members and extending from the rear face rearward beyond the trace members with the trace members positioned therebetween.

28. The termination block of claim 21 further including a plurality of spaced apart channels at the rear face, each of the channels receiving a free end portion of one of the tines.

29. The termination block of claim 21 wherein each of the tines springably engage a portion of the rear face to generate a forwardly directed tension force on the tine.

30. The termination block of claim 29 further including a plurality of spaced apart channels at the rear face and wherein a free end portion of one of the tines is positioned in each of the channels.

31. The termination block of claim 21 further including a plug extending through the rear aperture of the rear face and within the interior recess, the plug applying a forward force to the tines to generate a forwardly directed tension force in the tine.

32. The termination block of claim 31 further including a plurality of spaced apart channels at the rear face, and wherein a free end portion of one of the tines is positioned in each of the channels.

33. The termination block of claim 21 wherein the contact end portion of each of the tines has a flat forward facing contact surface with a coating of conductive metal thereon and the other portions of the contact end portion are uncoated.

34. The termination block of claim 21 arranged for carrying a mounting screw, the termination block further including a screw retainer extending rearward from the rear face and sized to removably retain the mounting screw.

35. The termination block of claim 34 for use with a wire cable having wires to be connected to the terminal connection pads, the screw retainer being sized to retain the cable when the mounting screw is removed therefrom to serve as a cable strain relief.

36. A termination block arranged for carrying first and second mounting screws, the termination block comprising:
- a rear face with a rear aperture;
- a front face with a front aperture, the front and rear faces being spaced apart;
- a plurality of mounting surfaces on the rear face;
- a plurality of screw receiving portions, each positioned at one of the mounting surfaces and having an opening and a screw receiver extending from the rear face toward the front face;
- an interior recess between the rear and front faces and accessible from the rear face through the rear aperture and accessible from the front face through the front aperture;
- a plurality of screws, each extending through the opening of one of the screw receiving portions and threadably received in the screw receiver thereof;
- plurality of terminal connection pads positioned at the rear face at one of the mounting surfaces, each terminal connection pad having a screw aperture therethrough positioned in alignment with the opening of the screw receiving portion positioned at the mounting surface and one of the screws extending through the screw aperture;
- a plurality of tines extending through the rear aperture of the rear face and positioned within the interior recess and positioned for access through the front aperture, each tine having a contact end portion, the contact end portions of the tines being in spaced apart arrangement in position within the interior recess;
- a plurality of trace members positioned at the rear face, each trace member electrically coupling together one of the terminal connection pads and one of the tines; and
- first and second screw retainers extending rearward from the rear face, each of the first and second screw retainers being sized to removably retain one of the first and second mounting screws.

37. The termination block of claim 36 wherein the first and second screw retainers are arranged to hold the first and second mounting screws in generally parallel orientation.

38. The termination block of claim 37 wherein the first and second screw retainers are sized to each retain a cable when the screw is removed therefrom to serve as a cable strain relief.

39. A termination block base for use with a plurality of screws, a plurality of wires, and a conductor having a plurality of terminal connection portions each configured to be in electrical contact with one of the plurality of wires held in place by one of the plurality of screws when assembled with the termination block base, a plurality of tine portions, and a plurality of trace member portions each coupled between one of the plurality of terminal connection portions and one of the plurality of tine portions, the termination block base comprising:
- a rear face and a front face spaced apart from the rear face;
- a plurality of screw receiving portions at the rear face sized to threadably receive one of the screws;
- an interior recess between the rear and front faces, the interior recess being accessible from the rear face through a rear aperture and accessible from the front face through a front aperture through the front face, the interior recess shaped to receive the plurality of tine portions therein projecting through the rear aperture in position to be accessed from the front aperture;
- a plurality of mounting surfaces on the rear face each to support one of the plurality of terminal connection portions; and
- a plug extending through the rear aperture of the rear face and within the interior recess and holding the plurality of tine portions therein spaced apart arrangement, the plug having a cover portion extending over a portion of the rear face to cover at least a portion of the trace member portions.

40. The termination block base of claim 39 wherein the plug has a plurality of channels, each having one of the plurality of tine portions therein positioned therein.

41. The termination block base of claim 39 further including at least one rear raised portion positioned adjacent to each of the plurality of terminal connection portions and extending from the rear face rearward beyond the adjacent terminal connection portion.

42. The termination block base of claim 39 further including a plurality of rear raised portions positioned adjacent to the plurality of trace member portions and extending from the rear face rearward beyond the plurality of trace member portions and arranged to position the trace member portions therebetween.

43. The termination block base of claim 39 for use with the plurality of tine portions each including a free end portion, the termination block base further including a plurality of spaced apart channels at the rear face, each of the channels arranged to receive the free end portion of one of the plurality of tine portions therein.

44. The termination block base of claim 39 arranged for carrying a mounting screw, the termination block base further including a screw retainer extending rearward from the rear face and sized to removably retain the mounting screw.

45. The termination block of claim 44 wherein the screw retainer is sized to retain a cable when the mounting screw is removed therefrom to serve as a cable strain relief.

46. A termination block comprising:
- a rear face with a rear aperture;
- a front face with a front aperture, the front and rear faces being spaced apart;
- a plurality of mounting surfaces on the rear face;
- an interior recess between the rear and front faces and accessible from the rear face through the rear aperture and accessible from the front face through the front aperture;
- a plurality of separate circuit portions, each circuit portion including a terminal connection portion, a tine portion and a trace member portion of one-piece construction, the terminal connection portion being positioned at one of the mounting surfaces on the rear face, the tine portion extending through the rear aperture of the rear face and positioned within the interior recess and positioned therein for access through the front aperture of the front face, and the trace member portion electrically coupling together the terminal connection portion and the tine portion; and
- a plug extending through the rear aperture of the rear face and within the interior recess and holding the tine portions of the plurality of circuit portions in spaced apart arrangement, the plug having a cover portion extending over a portion of the rear face and covering at least a portion of the trace member portions.

47. The termination block of claim 46 wherein the plug has a plurality of channels, each having one of the tine portions positioned therein.

48. The termination block of claim 46 further including at least one rear raised portion positioned adjacent to each of the terminal connection portions and extending from the rear face rearward beyond the adjacent terminal connection portions.

49. The termination block of claim 48 further including a plurality of forwardly projecting front support members, the front support members being positioned to engage at least a portion of the rear raised portions of another termination block when two termination blocks are positioned in engagement with the front face toward the rear face of the another termination block, the combined length of the front support members and the portions of the rear raised portions in engagement being sufficient to keep the front face from contacting the rear face of the another termination block.

50. The termination block of claim 46 further including rear raised portions positioned adjacent to the trace member portions and extending from the rear face rearward beyond the trace member portions with the trace member portions positioned therebetween.

51. The termination block of claim 46 further including a plurality of spaced apart channels at the rear face, each of thechannels receiving a free end portion of one of the tine portions.

52. The termination block of claim 46 wherein each of the tine portions includes a contact end portion positioned in the interior recess, each contact end portion having a flat forward facing contact surface with a coating of conductive metal thereon and the other portions of the contact end portion being uncoated.

53. The termination block of claim 46 arranged for carrying a mounting screw, the termination block further including a screw retainer extending rearward from the rear face and sized to removably retain the mounting screw.

54. The termination block of claim 53 for use with a wire cable having wires to be connected to the terminal connection pads, the screw retainer being sized to retain the cable when the mounting screw is removed therefrom to serve as a cable strain relief.

* * * * *